(12) United States Patent
Zhu et al.

(10) Patent No.: US 12,730,567 B2
(45) Date of Patent: Sep. 8, 2026

(54) MEMORY SYSTEMS, MEMORY CONTROLLERS, OPERATING METHODS, AND STORAGE MEDIUM

(71) Applicant: Yangtze Memory Technologies Co., Ltd., Wuhan (CN)

(72) Inventors: Zhijiu Zhu, Wuhan (CN); ZhuQin Duan, Wuhan (CN); JiaLiang Deng, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 3 days.

(21) Appl. No.: 19/054,365

(22) Filed: Feb. 14, 2025

(65) Prior Publication Data

US 2026/0056668 A1 Feb. 26, 2026

(30) Foreign Application Priority Data

Aug. 21, 2024 (CN) ........................ 202411158727.2

(51) Int. Cl.
*G06F 3/06* (2006.01)
*G06F 1/30* (2006.01)

(52) U.S. Cl.
CPC .............. *G06F 3/0619* (2013.01); *G06F 1/30* (2013.01); *G06F 3/0659* (2013.01); *G06F 3/0679* (2013.01)

(58) Field of Classification Search
CPC .... G06F 3/0619; G06F 3/0659; G06F 3/0679; G06F 1/30
USPC .......................................................... 711/154
See application file for complete search history.

(56) References Cited

U.S. PATENT DOCUMENTS

2013/0088928 A1 4/2013 Kwak
2016/0098328 A1* 4/2016 Lucas ...................... G06F 1/30 714/14
2019/0156904 A1 5/2019 Hong
2019/0243578 A1* 8/2019 Thompson ............ G06F 3/0619
2020/0151059 A1* 5/2020 Boals .................... G06F 11/108
2020/0348885 A1 11/2020 Zhang et al.
(Continued)

FOREIGN PATENT DOCUMENTS

CN 113936725 A 1/2022

OTHER PUBLICATIONS

China National Intellectual Property Administration, "The First Office and Search Report," issued in connection with Chinese Patent Application No. 202411158727.2, dated Jun. 19, 2026, 10 pages. [English machine translation included.].

*Primary Examiner* — Than Nguyen
(74) *Attorney, Agent, or Firm* — Hanley, Flight & Zimmerman, LLC

(57) ABSTRACT

The examples of the present disclosure provide a memory system, a memory controller, a memory and an operating method thereof, and relates to the technical field of semiconductors. The method comprises: performing a first program operation on a first memory cell to execute first data to be stored to a memory based on the first program operation and a second program operation; when a power outage occurs, generating level indicator data based on the first data, and performing a third program operation on the second memory cell to store the level indicator data. Therefore, faster data storage is realized, resources consumed by storage operation are saved, storage time is shortened, and data backup during power outage is better realized.

20 Claims, 28 Drawing Sheets

(56) References Cited

U.S. PATENT DOCUMENTS

| | | | | |
|---|---|---|---|---|
| 2021/0166769 | A1 | 6/2021 | Liang et al. | |
| 2021/0240397 | A1 | 8/2021 | Zhang et al. | |
| 2021/0280258 | A1 | 9/2021 | Liang et al. | |
| 2022/0165741 | A1 | 5/2022 | Xie et al. | |
| 2022/0189566 | A1 | 6/2022 | Lee et al. | |
| 2022/0206710 | A1 | 6/2022 | Alrod et al. | |
| 2022/0254417 | A1 | 8/2022 | Wang et al. | |
| 2022/0293187 | A1 | 9/2022 | Guo et al. | |
| 2023/0020789 | A1 | 1/2023 | Lee et al. | |
| 2023/0176967 | A1* | 6/2023 | Moshe | G06F 3/0679 714/6.11 |

* cited by examiner

| Programmed state | P0 | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|---|
| level indicator data | 0 | 1 | 0 | 1 | 0 | 1 | 0 | 1 | 0 | 1 | 0 | 1 | 0 | 1 | 0 | 1 |

FIG. 15B

| Gray Code | LV0 | LV1 | LV2 | LV3 | LV4 | LV5 | LV6 | LV7 | LV8 | LV9 | LV10 | LV11 | LV12 | LV13 | LV14 | LV15 |
|---|---|---|---|---|---|---|---|---|---|---|---|---|---|---|---|---|
| D1(LP) | 1 | 1 | 0 | 0 | 0 | 0 | 0 | 0 | 1 | 1 | 1 | 1 | 1 | 1 | 0 | 0 |
| D2(MP) | 1 | 1 | 1 | 1 | 1 | 0 | 0 | 0 | 0 | 0 | 1 | 1 | 0 | 0 | 0 | 1 |
| D3(UP) | 1 | 1 | 1 | 0 | 0 | 0 | 0 | 1 | 1 | 0 | 0 | 0 | 0 | 1 | 1 | 1 |
| DC(XP) | 1 | 0 | 0 | 0 | 1 | 1 | 0 | 0 | 0 | 0 | 0 | 1 | 1 | 1 | 1 | 1 |
| DL(level indicator data) | 0 | 1 | 0 | 1 | 0 | 1 | 0 | 1 | 0 | 1 | 0 | 1 | 0 | 1 | 0 | 1 |

FIG. 17

| | L- | L+ | DL | LP data |
|---|---|---|---|---|
| LV0 | 1 | 1 | 0 | 1 |
| LV1 | 0/1 | 1 | 1 | 1 |
| LV2 | 0 | 0/1 | 0 | 0 |
| LV3~LV6 | 0 | 0 | 0/1 | 0 |
| LV7 | 0/1 | 0 | 1 | 0 |
| LV8 | 1 | 0/1 | 0 | 1 |
| LV9~LV12 | 1 | 1 | 0/1 | 1 |
| LV13 | 0/1 | 1 | 1 | 1 |
| LV14 | 0 | 0/1 | 0 | 0 |
| LV15 | 0 | 0 | 1 | 0 |

FIG. 20

MEMORY SYSTEMS, MEMORY CONTROLLERS, OPERATING METHODS, AND STORAGE MEDIUM

CROSS-REFERENCE TO RELATED APPLICATIONS

This application claims priority to and the benefit of Chinese Patent Application 202411158727.2, filed on Aug. 21, 2024, which is hereby incorporated by reference in its entirety.

TECHNICAL FIELD

The present disclosure relates to the field of semiconductor technology, and particularly to memory systems, memory controllers, memory devices and operating methods thereof.

BACKGROUND

A memory device, such as a NAND flash memory device, may store multiple bits of information at multiple levels in each memory cell to increase the memory capacity and reduce the cost per bit. Flash memory is a low cost, high density, non-volatile memory. The flash memory may perform various operations, such as read operations, program (write) operations, and erase operations.

BRIEF DESCRIPTION OF THE DRAWINGS

The accompanying drawing herein are incorporated into the specification to constitute a part of the specification, illustrate examples conforming to the present disclosure, and are used together with the specification to explain the principle of the present disclosure. Apparently, the drawings described below are only some examples of the present disclosure. A person of ordinary skill in the art may obtain other drawings according to such drawings without creative work.

FIG. 15B illustrates level indicator data corresponding to different programmed states according to an example of the present disclosure;

FIG. 17 illustrates an example of 4 bits of data according to an example of the present disclosure;

DETAILED DESCRIPTION

Figure 1:
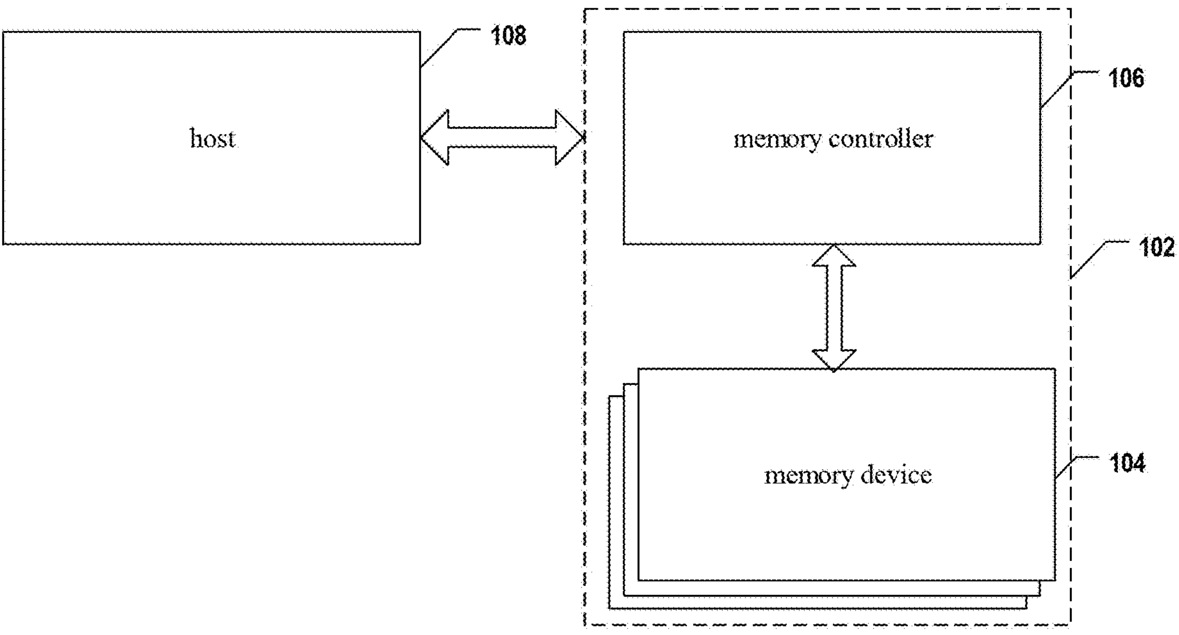
FIG. 1 illustrates a block diagram of an example system with memory according to an example of the present disclosure.

Examples will now be described more comprehensively with reference to the drawings. However, the examples can be implemented in various forms and should not be construed as being limited to examples set forth herein. In contrast, these examples are provided to make the present disclosure to be thorough and complete, and to fully convey the concept of the examples to a person skilled in the art. Same reference numerals in the drawings denote same or like parts, and thus repeated descriptions thereof are omitted.

The features, structures or characteristics described in the present disclosure may be combined in one or more implementations in any proper manner. In the following description, many specific details are provided thereby presenting a full understanding of the implementations of the present disclosure. However, those skilled in the art will realize that the technical solutions of the present disclosure may be practiced and one or more of the particular details may be omitted, or other methods, elements, apparatuses, operations, etc., may be employed. In other cases, well-known methods, apparatuses, implementations, or operations are not shown or described in detail to avoid obscuring aspects of the present disclosure.

The accompanying drawings are schematic illustrations, in which same reference numerals denote same or like parts, and thus repeated descriptions thereof are omitted. Some block diagrams shown in the drawings do not necessarily correspond to physically or logically separate entities. These functional entities may be implemented in a software form, or implemented in at least one hardware module or integrated circuit, or implemented in different networks and/or processor apparatuses and/or microcontroller apparatuses.

The flow diagrams shown in the accompanying drawings are merely example illustrations and do not necessarily comprise all the contents and operations, and do not have to be executed in the described order. For example, some operations may be divided, and some operations may be combined or partially combined, so that an actual order of execution may change depending on actual situations.

In the specification, the terms “one”, “a”, “the”, “the described” and “at least one” are used to indicate the presence of at least one element/constituent part/etc.; the terms “comprise”, “include” and “have” are used to indicate open-ended inclusion and refer to the presence of other elements/components/etc., in addition to those listed elements/components/etc.; and the terms “first”, “second” and “third”, etc. are used only as labels instead of limitations to the quantity of objects thereof.

Multi-pass programming operation techniques for a memory device are used to store multi-bit information in memory cells of the memory device. For example, a two-pass programming operation technique controls a threshold voltage of a memory cell from an erased state to an intermediate state using a first pass programming operation, referred to as a coarse program, and then controls the threshold voltage of the memory cell from the intermediate state to a target memory state using a second pass programming operation, referred to as a fine program, thereby storing N bits of information in the memory cell. Multi-pass programming in a memory device involves a multi-pass programming operation of a memory cell to improve the efficiency of storing multiple bits in the memory cell of the memory device. When a power outage occurs, data in a programming process may be lost and requires power outage processing.

FIG. 1 illustrates a schematic diagram of an example system with a memory according to an example of the present disclosure. As shown in FIG. 1, the system 100 may be a mobile phone, a desktop computer, a laptop computer, a tablet computer, a vehicle computer, a game console, a printer, a positioning device, a wearable electronic device, a smart sensor, a Virtual Reality (VR) device, an Augmented Reality (AR) device or any other suitable electronic devices having memory devices therein. As shown in FIG. 1, the system 100 may comprise a host 108 and a memory system 102 having one or more memories 104 and a memory controller 106.

The host 108 may be a processor (e.g., a Central Processing Unit (CPU)) or a System on a Chip (SoC) (e.g., an Application Processor (AP)) of an electronic device. The host 108 may be coupled to the memory controller 106, and is configured to send or receive data to or from the memory 104 through the memory controller 106. For example, the host 108 may send program data in a program operation or receive read data in a read operation. The host 108 is configured to receive and send instructions and commands from and to the memory controller 106 of the memory system 102, and perform or implement a plurality of functions and operations provided in the present disclosure, which will be described below.

The memory 104 may be any memory disclosed in the present disclosure, e.g., a NAND flash memory, which comprises a page buffer having a plurality of portions. It is to be noted that for illustrative purposes, a NAND flash memory is merely one example of the memory. The memory 104 may comprise any suitable non-volatile memory, such as a NOR flash memory, a Ferroelectric Random Access Memory (FeRAM), a Phase Change Memory (PCM), a Magnetic Random Access Memory (MRAM), a Spin-Transfer Torque Random Access Memory (STT-RAM), or a Resistive Random Access Memory (RRAM), and etc. In some implementations, the memory 104 comprises a three-dimensional (3D) NAND flash memory.

The memory controller 106 may be implemented through any of the following: a microprocessor, a microcontroller (also referred to as a Microcontroller Unit (MCU)), a Digital Signal Processor (DSP), an Application Specific Integrated Circuit (ASIC), a Field-Programmable Gate Array (FPGA), a Programmable Logic Device (PLD), a state machine, a gating logic, a discrete hardware circuit, and other suitable hardware, firmware, or software configured to perform various functions described below in detail.

According to some implementations, the memory controller 106 is coupled to the memory 104 and the host 108, and configured to control the memory 104. The memory controller 106 can manage data stored in the memory 104 and communicate with the host 108. In some implementations, the memory controller 106 is designed for operating in a low duty-cycle environment, such as a Secure Digital (SD) card, a Compact Flash (CF) card, a Universal Serial Bus (USB) flash drive, or other media for use in electronic devices (such as a personal computer, a digital camera, and a mobile phone). In some implementations, the memory controller 106 is designed for operating in a high duty-cycle environment, such as an SSD or an embedded MultiMedia Card (eMMC) that is used as a data memory apparatus for a mobile device (such as a smartphone, a tablet computer, and a laptop computer) and an enterprise memory array. The memory controller 106 may be configured to control operations of the memory 104, such as read, erase, and program operations, by providing instructions such as a read instruction to the memory 104. For example, the memory controller 106 may be configured to provide the read instruction to a peripheral circuit of the memory 104 to control the read operation. The memory controller 106 may be further configured to manage various functions with respect to data stored or to be stored in the memory 104, comprising, but not limited to, bad block management, Garbage Collection (GC), logical-to-physical address conversion, and wear leveling, etc. In some implementations, the memory controller 106 is further configured to process an Error Correcting Code (ECC) with respect to data read from or written to the memory 104. The memory controller 106 may also perform any other suitable functions, e.g., formatting the memory 104.

The memory controller 106 may communicate with an external device (e.g., the host 108) according to a particular communication protocol. For example, the memory controller 106 may communicate with the external device through at least one of various interface protocols, such as a USB protocol, a Multi Media Card (MMC) protocol, a Peripheral Component Interconnect (PCI) protocol, a Peripheral Component Interconnect Express (PCI-Express, PCI-E) protocol, an Advanced Technology Attachment (ATA) protocol, a serial ATA protocol, a parallel ATA protocol, a Small Computer System Interface (SCSI) protocol, an Enhanced Small Drive Interface (ESDI) protocol, an Integrated Drive Electronics (IDE) protocol, and a Firewire protocol.

The memory controller 106 and one or more memories 104 may be integrated into various types of memories, e.g., be comprised in the same package (such as a Universal Flash Storage (UFS) package or an eMMC package). That is, the memory system 102 may be implemented and packaged into different types of end electronic products.

Figure 2A:
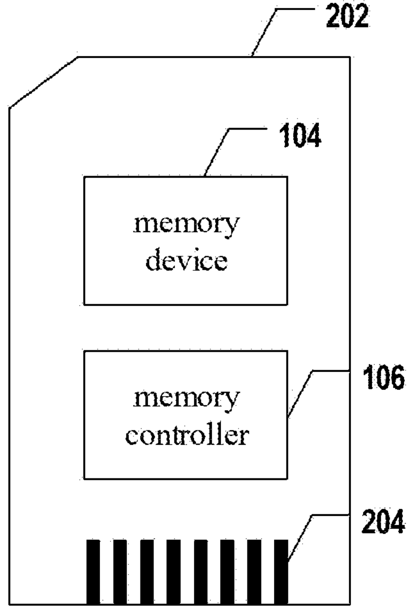
FIG. 2A illustrates a block diagram of a memory system.

FIG. 2A illustrates an example block diagram of a memory system. As shown in FIG. 2A, the memory controller 106 and the memory 104 may be integrated into a memory card 202. The memory card 202 may comprise a PC (Personal Computer Memory Card International Association (PCMCIA)) card, a CF card, a Smart Media (SM) card, a memory stick, a Multi Media Card (MMC), an SD card, and a UFS, etc. The memory card 202 may further comprise a memory card connector 204 coupling the memory card with a host (e.g., the host 108 in FIG. 1).

Figure 2B:
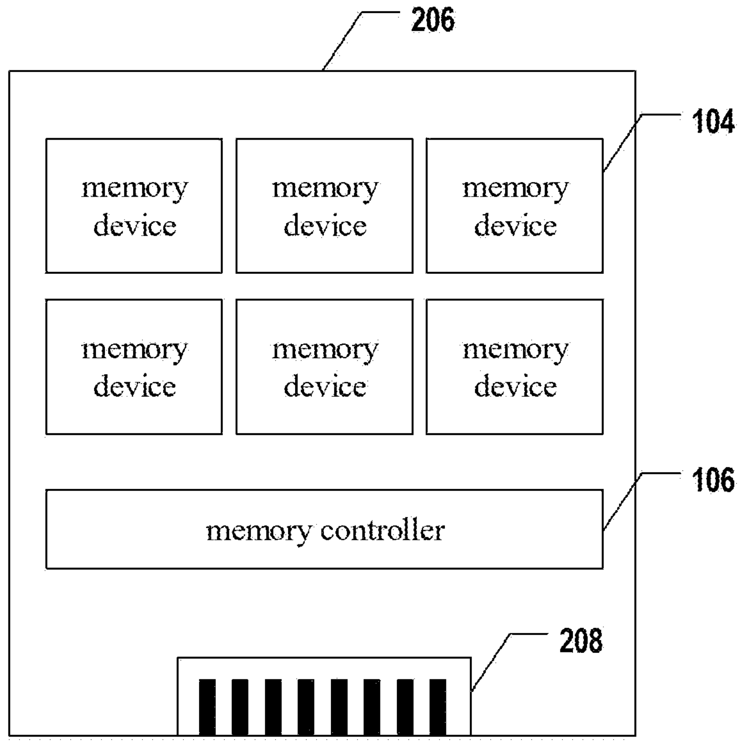
FIG. 2B illustrates a block diagram of another memory system.

FIG. 2B illustrates an example block diagram of another memory system. As shown in FIG. 2B, the memory controller 106 and a plurality of memories 104 may be integrated into a solid state disk (SSD) 206. SSD 206 may also comprise an SSD connector 208 that couples SSD 206 with a host (e.g., host 108 in FIG. 1). In some examples, the storage capacity and/or operating speed of SSD 206 is greater than the storage capacity and/or operating speed of memory card 202.

Figure 2C:
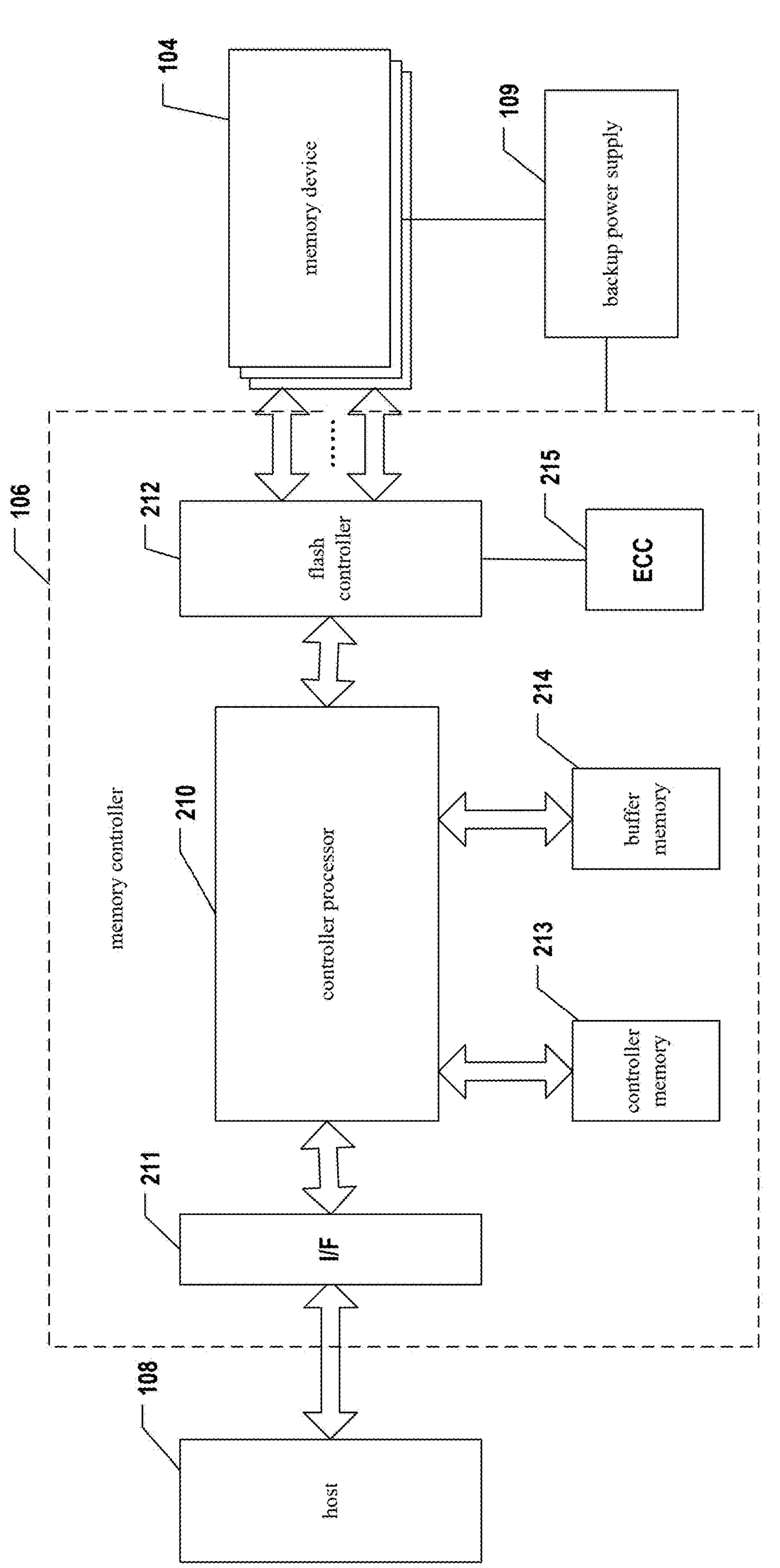
FIG. 2C illustrates a block diagram of yet another memory system.

FIG. 2C illustrates a schematic diagram of an example memory controller with a memory system according to an example of the present disclosure. As shown in FIG. 2C, the memory controller 106 is coupled and connected with the host 108 and one or more memory devices 104 respectively, and is configured to control sending of data from the host 108 to the memory 104 or reading of data from the memory 104 and returning of the data to the host 108. The memory controller 106 at least comprises: a controller processor 210, a host interface controller 211, a flash memory controller 212, a controller memory 213, a buffer memory 214, and an error correction code (ECC) module 215.

The controller processor 210, a core part of the memory controller, is configured to execute a control logic and an algorithm of the memory controller, and is responsible for processing functions such as command queuing, address mapping, garbage collection, data compression, and input/output control. The controller processor 210 may be implemented through an embedded processor or FPGA.

The host interface controller 211, coupled with the host 108 and the controller processor 210 respectively, is a communication interface component between the host and the memory controller, and is responsible for data transmission between the host and the memory controller, comprising read and write of data and receiving and sending of a command. The host interface controller typically supports various interfaces (e.g., Serial Advanced Technology Attachment (SATA), and PCIe) and protocols (e.g., Advanced Host Controller Interface (AHCI), and Non-Volatile Memory Express (NVMe)), and provides a data transmission function.

The flash memory controller 212, coupled with the memory 104 and the controller processor 210 respectively, is a communication interface component between the memory device and the memory controller, and is responsible for implementing functions such as reading, writing and erasing of data, and address mapping.

The controller memory 213, coupled with the controller processor 210, is a memory region for storing instructions and data of the controller, and may provide quick read and write operations and a real-time control function. The controller memory usually employs a storage medium such as a NOR flash, a NAND flash, or a RAM.

The buffer memory 214, coupled with the controller processor 210, is a component configured to store data temporarily, and may be also configured to buffer instructions and data. The buffer memory typically employs a high-speed memory device, such as a Dynamic Random-Access Memory (DRAM) and a Static Random-Access Memory (SRAM), so as to improve the read write performance of the memory controller and reduce the latency.

The ECC module 215 is configured to detect and correct an error in data read from the memory device. ECC check data is stored in a reserved space of the memory 104 for data check.

In an example, the memory system further comprises a backup power supply 109 for providing power to the system upon abnormal power outage. The backup power supply 109 may employ capacitors.

Figure 3:
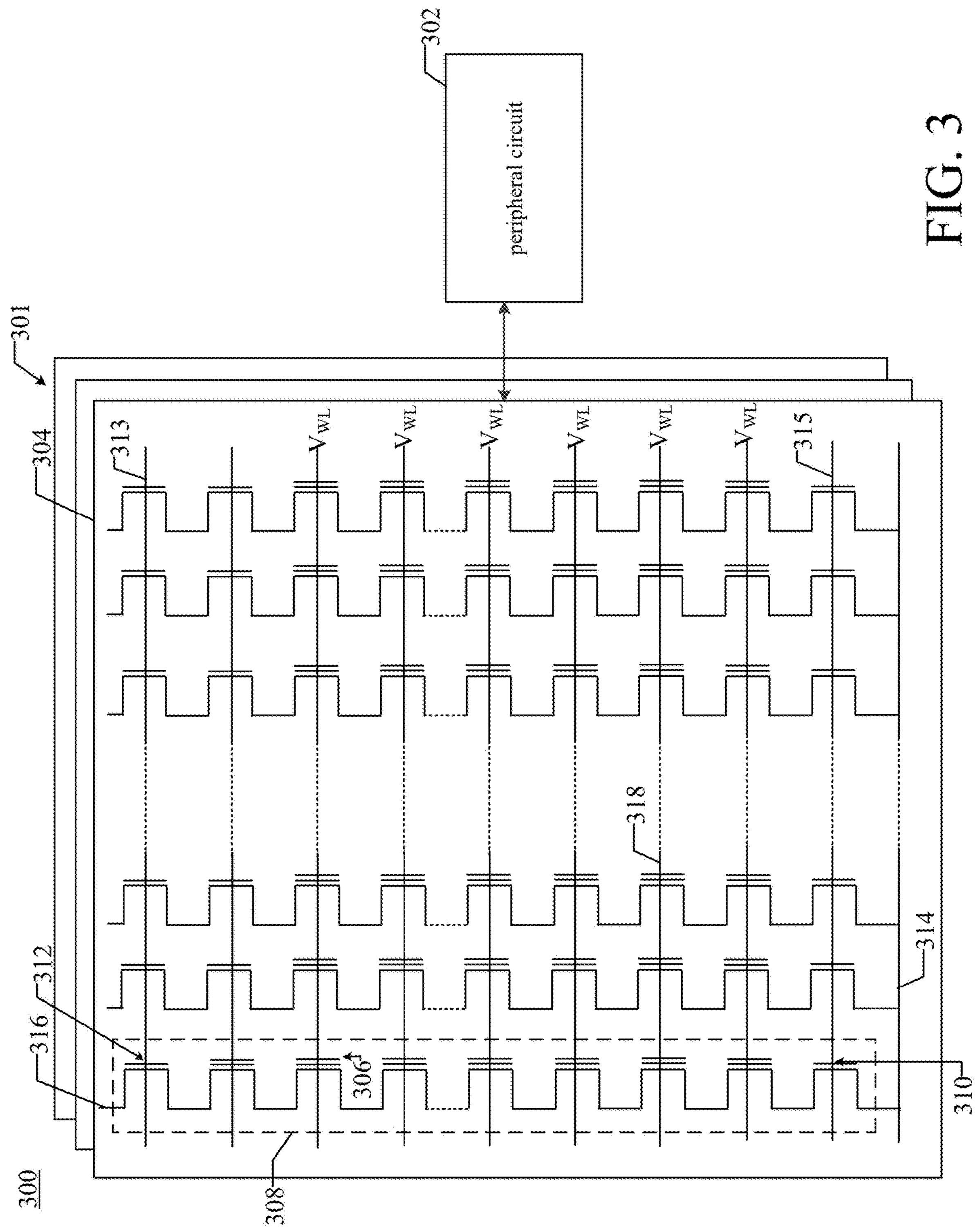
FIG. 3 illustrates a schematic circuit diagram of a memory comprising a peripheral circuit according to an example of the present disclosure.

FIG. 3 is a schematic circuit diagram of a memory comprising a peripheral circuit according to an example of the present disclosure. Memory 300 may be an example of memory 104 in FIG. 1. The memory 300 may comprise a memory cell array 301 and a peripheral circuit 302 coupled to the memory cell array 301. The memory cell array 301 may be an array of NAND flash memory cells in which memory cells 306 are provided in the form of an array of NAND flash memory strings 308 each extending vertically above a substrate (not shown).

In some examples, the peripheral circuit 302 is configured to perform the operating methods according to the examples of the present disclosure. It may be understood that the peripheral circuit 302 may be configured to perform the operating methods provided by the examples of the present disclosure according to the received instruction of the memory controller 106.

In some examples, each memory string 308 comprises a plurality of memory cells 306 coupled in series and stacked vertically. Each memory cell 306 can hold a continuous, analog value, such as an electrical voltage or charge, which depends on the number of electrons trapped within the region of memory cell 306. Each memory cell 306 can be a floating gate type of memory cell comprising a floating-gate transistor or a charge trap type of memory cell comprising a charge-trap transistor.

In some examples, each memory cell 306 may store 1 bit of data or 2 bits of data or more bits of data, that is, may be a Single-Level Cell (SLC) type, a Multi-Level Cell (MLC) type, a Triple-level cell (TLC) type, a Quad-Level Cell (QLC) type, or a higher level type. The p (p is a positive integer) level cell may have $2^p$ states (e.g., one state corresponds to one threshold voltage distribution interval), so p bits of data may be stored. A memory cell of the SLC type may have 2 states, so 1 bit of data may be stored; a memory cell of the MLC type may have 4 states, so 2 bits of data may be stored; a memory cell of the TLC type may have 8 states, so 3 bits of data may be stored; a memory cell of the QLC type may have 16 states, so 4 bits of data may be stored, and so on. The $2^p$ states may comprise one erased state and $2^p-1$ programmed states. A NAND flash memory of the p level cell type may perform program and/or read operations on data page by page in pages. During a program operation, a memory cell of a NAND flash memory of the p level cell type is programmed to have $2^p$ states, when one memory cell is programmed to a target state of $2^p$ states, it is referred to be in the target programmed state. As shown in FIG. 3, each memory string 308 may comprise a source select gate (SSG) 310 at its source end and a drain select gate (DSG) 312 at its drain end. The SSG 310 and the DSG 312 may be configured to activate the selected memory string 308 during read and program operations.

In some examples, the sources of memory strings 308 in the same block 304 are coupled through a same source line (SL) 314, e.g., a common SL. For example, all memory strings 308 in the same block 304 have an array common source (ACS). As shown in FIG. 3, the memory string 308 may be organized into a plurality of blocks 304, each of which may have a common source line 314 (e.g., coupled to ground). In some examples, each block 304 is a basic data unit for an erase operation, e.g., all memory cells 306 on the same block 304 are erased at the same time.

In some examples, the transistors of the DSG 312 of each memory string 308 are coupled to a respective bit line (BL) 316 from which data can be read or written via an output bus (not shown). Each memory string 308 can be configured to be selected or deselected by applying a select voltage (e.g., above the threshold voltage of a transistor with DSG 312) or a deselect voltage (e.g., 0 V) to the respective DSG 312 through one or more DSG lines 313 and/or by applying a select voltage (e.g., above the threshold voltage of a transistor with SSG 310) or a deselect voltage (e.g., 0 V) to the respective SSG 310 through one or more SSG lines 315.

As shown in FIG. 3, the memory cells 306 of the memory string 308 can be coupled through word lines (WL) 318 that select which row of memory cells 306 is affected by the read and program operations. Peripheral circuits 302 can be coupled to memory cell array 301 through bit lines 316, word lines 318, source lines 314, SSG lines 315, and DSG lines 313. Peripheral circuits 302 can include any suitable analog, digital, and mixed-signal circuits for facilitating the operations of memory cell array 301 by applying and sensing voltage signals and/or current signals to and from each of the memory cell 306 that become the operation target through bit lines 316, word lines 318, source lines 314, SSG lines 315, and DSG lines 313. Peripheral circuits 302 can include various types of peripheral circuits formed using metal-oxide-semiconductor (MOS) technologies.

Figure 4:
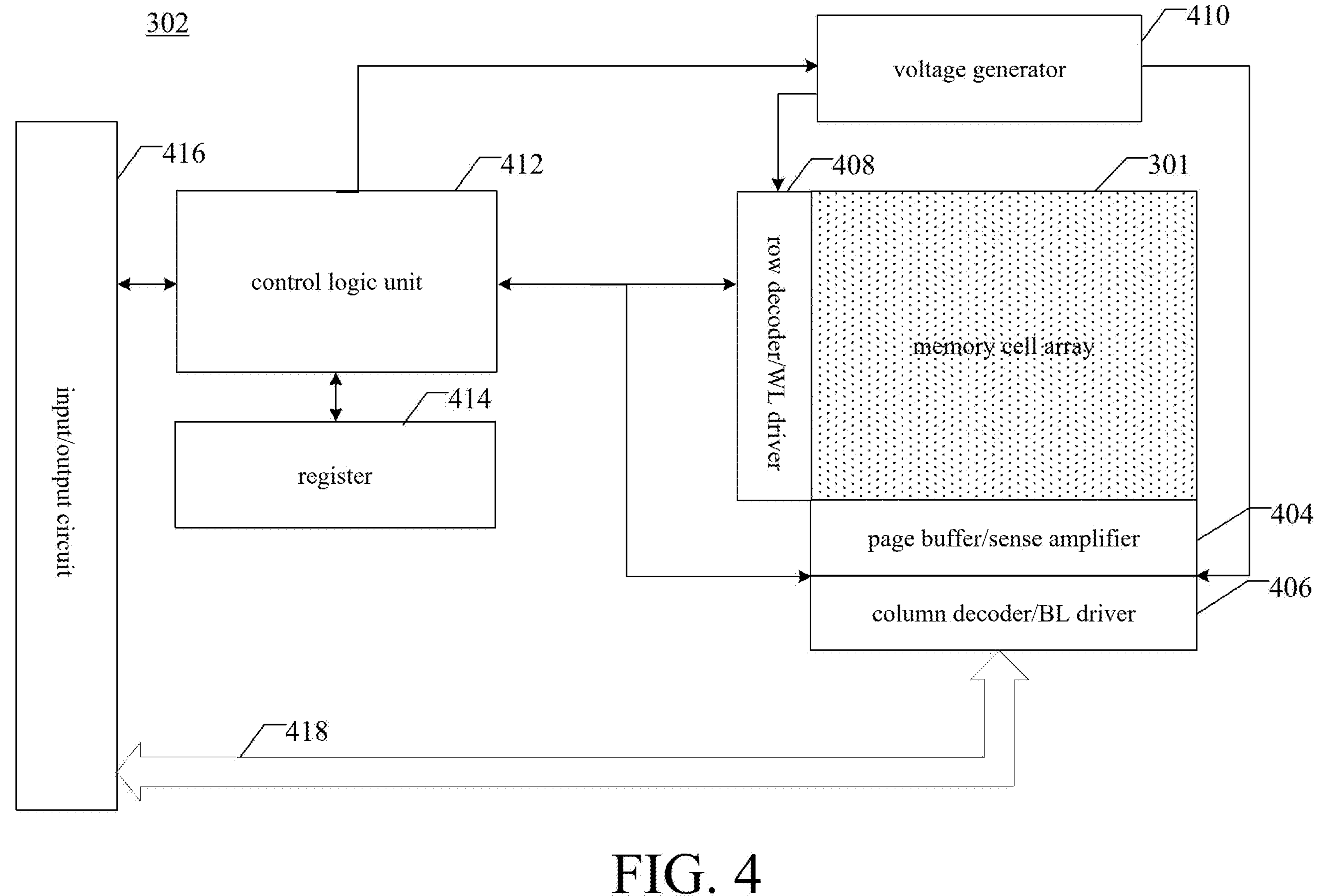
FIG. 4 illustrates a schematic diagram of a peripheral circuit according to an example of the present disclosure.

FIG. 4 is a schematic diagram of a peripheral circuit according to an example of the present disclosure. As shown in FIG. 4, the peripheral circuit 302 may comprise a page buffer/sense amplifier 404, a column decoder/BL driver 406, a row decoder/WL driver 408, a voltage generator 410, a control logic unit 412, a register 414, an input/output (I/O) circuit 416, and a data bus 418. It should be understood that in some examples, additional peripheral circuits not shown in FIG. 4 may be included as well.

In some examples, the page buffer/sense amplifier 404 can be configured to read and program (write) data from and to memory cell array 301 according to the control signals from the control logic unit 412. For example, the page buffer/sense amplifier 404 may store one page of program data (write data) to be programmed into memory cell array 301. In another example, the page buffer/sense amplifier 404 may also sense the low power signal from bit line 316 that represents a data bit stored in memory cell 306 and amplify the small voltage swing to a recognizable logic level in a read operation. Column decoder/BL driver 406 can be configured to be controlled by control logic unit 412 and select one or more memory strings 308 by applying bit line voltages generated from voltage generator 410.

The row decoder/WL driver 408 can be configured to be controlled by control logic unit 412 and select/deselect blocks 304 of memory cell array 301 and select/deselect word lines 318 of block 304. The row decoder/WL driver 408 can be further configured to drive word lines 318 using word line voltages generated from voltage generator 410. In some examples, the row decoder/WL driver 408 can also select/deselect and drive SSG lines 314 and DSG lines 313. The voltage generator 410 can be configured to be controlled by control logic unit 412 and generate the word line voltages (e.g., read voltage, program voltage, pass voltage, local voltage, verify voltage, etc.), bit line voltages, and source line voltages to be supplied to memory cell array 301.

The control logic unit 412 may be coupled to each portion of the peripheral circuit 302 and configured to control operation of each portion. Registers 414 can be coupled to control logic unit 412 and can include status registers, command registers, and address registers for storing status information, command operation codes (OP codes), and command addresses for controlling the operations of each peripheral circuit. The input/output circuit 416 can be coupled to control logic unit 412 and act as a control buffer to buffer control commands received from a host (not shown) and relay the control commands to control logic unit 412, and to buffer status information received from control logic unit 412 and relay the status information to the host. The input/output circuit 416 can also be coupled to column decoder/bit line driver 406 via data bus 418 and act as a data I/O interface and a data buffer to buffer data and relay the data to the memory cell array 301 and to buffer and relay data from the memory cell array 301.

Figure 5:
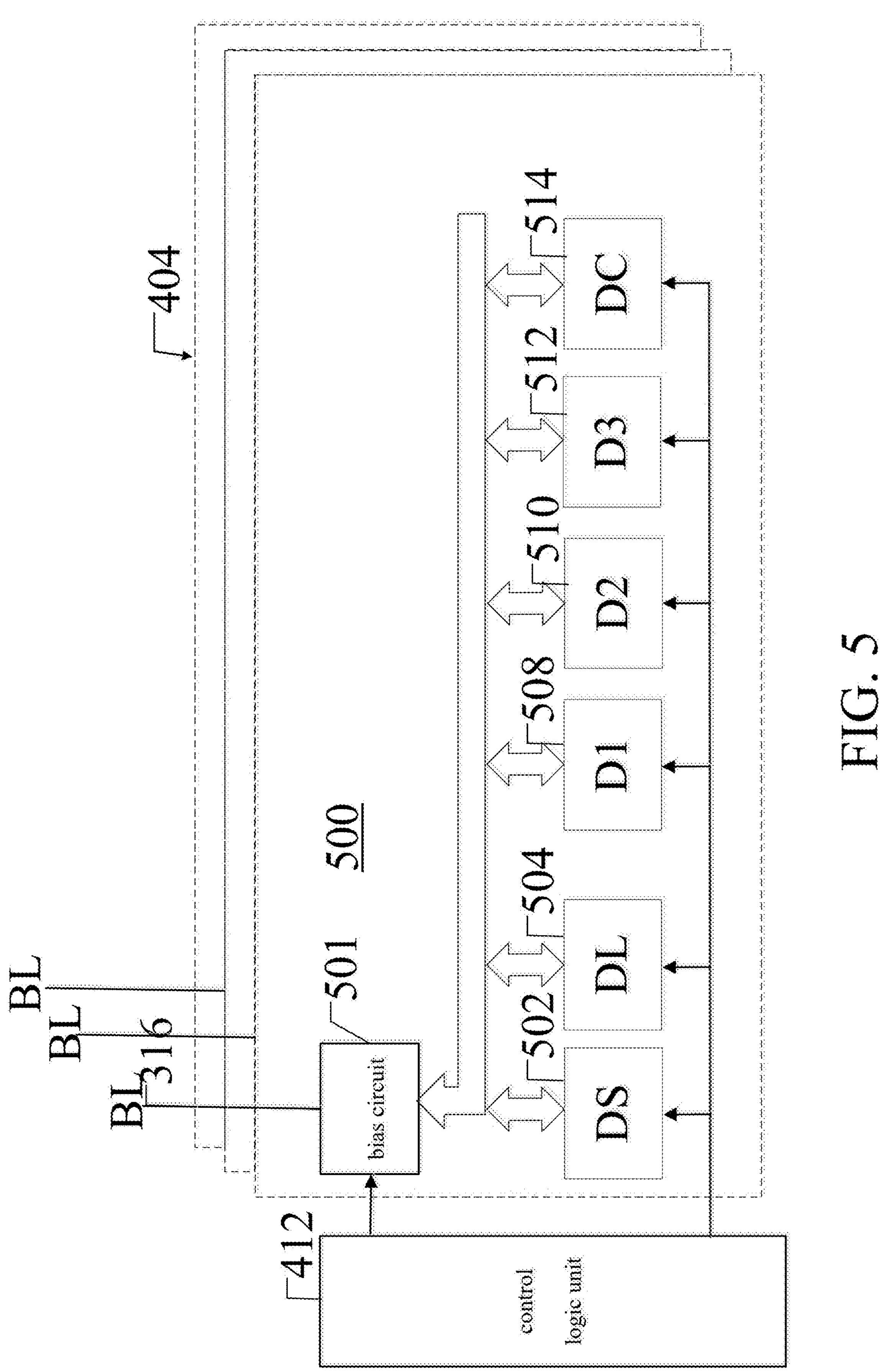
FIG. 5 illustrates a block diagram of a page buffer/sense amplifier.

FIG. 5 illustrates an example block diagram of a page buffer/sense amplifier. FIG. 5 may be an example of the page buffer/sense amplifier 404 in FIG. 4 for implementing the methods according to the examples of the present disclosure. As shown in FIG. 5, the page buffer/sense amplifier 404 may comprise a plurality of page buffer circuits 500 each coupled to a respective one of the bit lines 316, e.g., each page buffer circuit 500 may be coupled to a respective memory string 308 through a corresponding bit line 316 and configured to temporarily store segments of multi-bit data for programming a respective selected memory cell (coupled to the select word line 318 and a bit line 316 coupled with the selected memory cell) in a program operation. FIG. 5 illustrates example 4 data latch circuits D1 508, D2 510, D3 512 and DC 514, each data storage circuit may be, for example, a latch that may be configured to temporarily store 4 bits of data to be programmed into the QLC memory cell. It should be understood that the number of data latch circuits may be adjusted according to the number of bits of the data to be programmed into the memory cell.

Each page buffer circuit 500 may comprise a bias circuit 501 coupled to a respective bit line 316 and configured to be controlled by the control logic unit 412, and applies a bit line voltage to a corresponding selected memory cell coupled to a respective bit line 316 in a program operation. Each page buffer circuit 500 may also comprise a plurality of latch circuits for storing non-data page information (e.g., any information other than the data bits in the data page). As shown in FIG. 5, in some implementations, the page buffer circuit 500 may comprise a sense latch circuit DS 502 configured to latch data based on a current flowing through the bit line. The page buffer circuit 500 may further comprise a data latch circuit DL 504, which may be configured to temporarily store the generated level indicator data and may also be configured to latch result information after a verify operation is performed after a OV or V_3BL is applied on the bit line 316.

Figure 6:
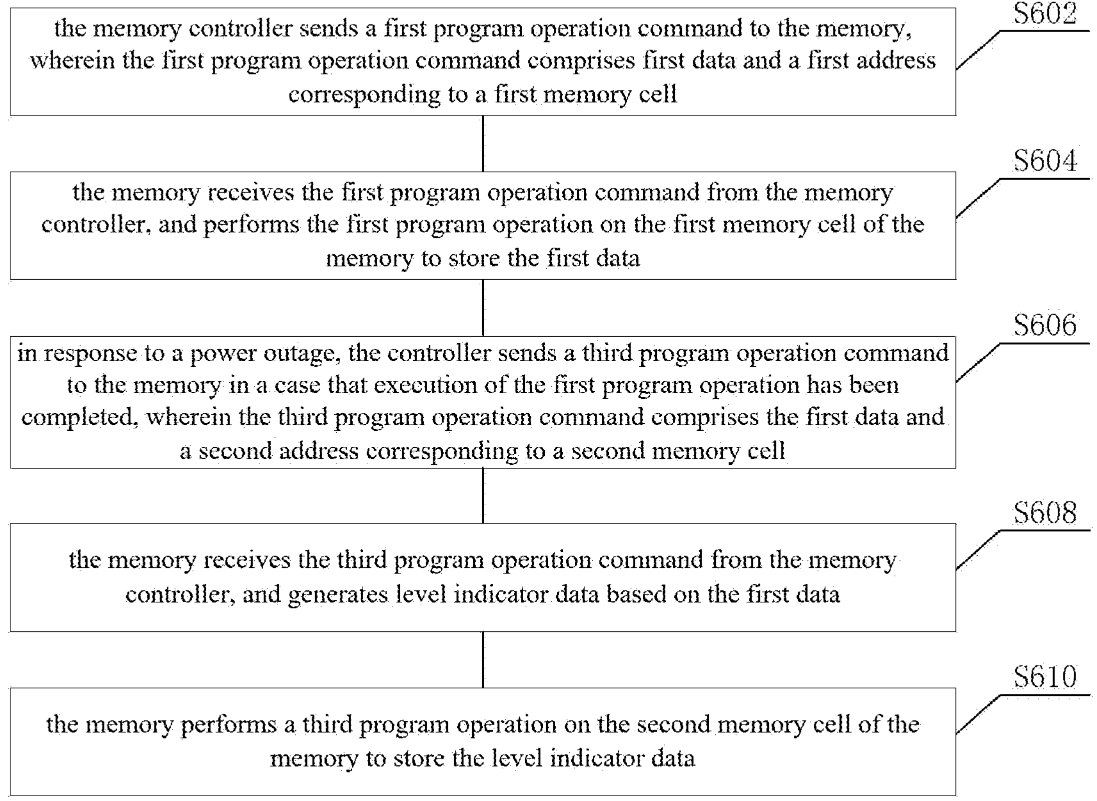
FIG. 6 illustrates a flowchart of an operating method of a memory system according to an example of the present disclosure.

FIG. 6 illustrates a flowchart of an operating method of a memory system according to an example of the present disclosure.

As shown in FIG. 6, at S602, the memory controller sends a first program operation command to the memory, wherein the first program operation command comprises first data and a first address, the first data is data to be stored to the memory based on a first program operation and a second program operation, and the first address corresponds to a first memory cell. In an example, the first program operation is a first-pass programming operation in a multi-pass programming operation and the second program operation is a second-pass programming operation in the multi-pass programming operation. In an example, the first program operation is a coarse programming operation and the second program operation is a fine programming operation.

At S604, the memory receives the first program operation command from the memory controller, and performs the first program operation on the first memory cell of the memory to store the first data. The memory receives the first program operation command, determines the first memory cell according to the first address in the command, and performs the first program operation on the first memory cell. In an example, the first program operation is a first-pass programming operation, such as a coarse programming operation. In an example, the first memory cell is a triple-level cell (TLC), or a quad-level cell (QLC), or a multi-level cell (MLC).

At S606, in response to a power outage, the memory controller sends a third program operation command to the memory in a case that execution of the first program operation has been completed, wherein the third program operation command comprises the first data and a second address corresponding to a second memory cell. The power outage may be a normal power outage or an abnormal power outage. In an example, an execution result of the first program operation may be obtained through a read status command. For example, the execution result of the first program operation may be obtained through the read status command before the power outage occurs; or the execution result of the first program operation may be obtained through the read status command after the power outage occurs.

At S608, the memory receives the third program operation command comprising the first data and the second address from the memory controller, and generates level indicator data based on the first data. In an example, the level indicator data is generated based on parity information of the first data.

At S610, the memory performs a third program operation on the second memory cell of the memory to store the level indicator data. The memory determines a second memory cell based on the second address in the third program operation command, performs a third program operation on the second memory cell based on the level indicator data, and stores the level indicator data in the second memory cell. In an example, the third program operation is a Single Level Cell (SLC) program operation.

In the foregoing examples, in the process of performing multi-pass programming operation on the first data, if a power outage occurs, for the memory cell on which the first program operation has been performed, the second program operation would not be performed but the level indicator information of the first data is obtained, and the level indicator information of the first data is stored in the second memory cell through the third program operation. In this way, faster data storage can be realized, resources consumed by storage operation are saved, storage time is shortened, and data backup during power outage is better realized. Further, the third program operation adopts an SLC program operation, which has a short execution time, consumes less resources, and is beneficial to data backup.

In an example, when an abnormal power outage occurs, the backup power supply 109 (as shown in FIG. 2C) in the memory system provides power to the system, thereby supporting to complete the data backup operation described above during the power outage.

The implementation of the operating method is described below from the perspective of the memory controller and the memory, respectively, by FIG. 7A and FIG. 7B.

Figure 7A:
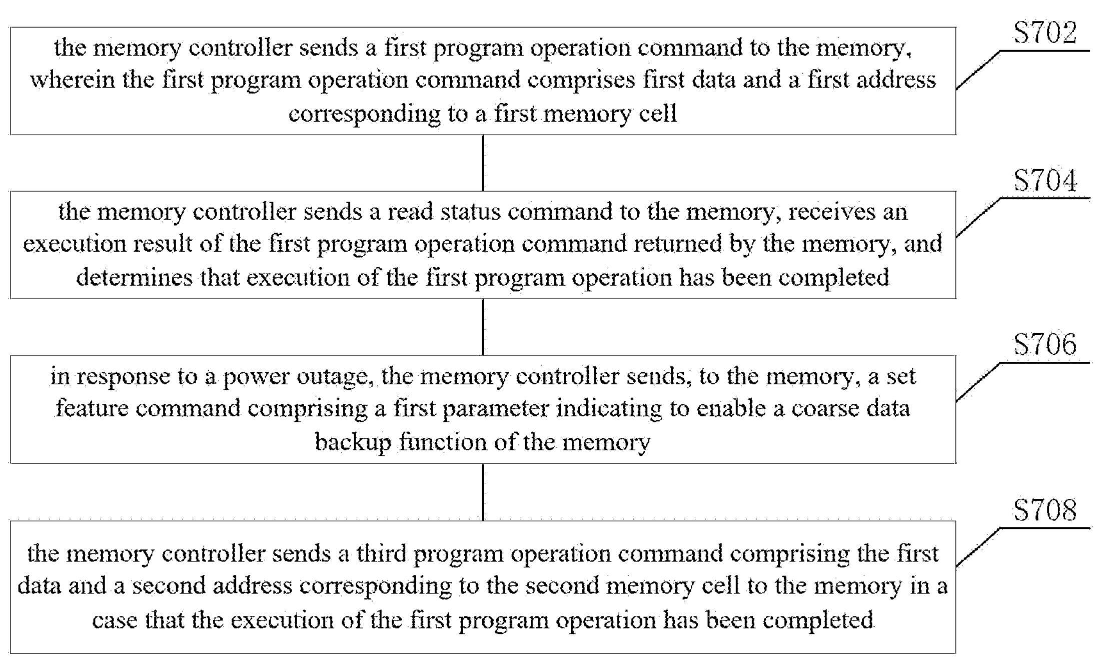
FIG. 7A illustrates a flowchart of an operating method of a memory controller according to an example of the present disclosure.

FIG. 7A illustrates a flowchart of an operating method of a memory controller according to an example of the present disclosure. In this example, when power outage occurs, the controller enables a coarse data backup function by a set feature command to perform the set power outage backup processing.

As shown in FIG. 7A, at S702, the memory controller sends a first program operation command to the memory, wherein the first program operation command comprises first data and a first address, the first data is data to be stored to the memory based on a first program operation and a second program operation, and the first address corresponds to a first memory cell. In an example, the first program operation and the second program operation correspond to a first-pass programming operation and a second-pass programming operation in a two-pass programming operation, respectively.

At S704, the memory controller sends a read status command to the memory, and receives an execution result of the first program operation command returned by the memory. Based on the execution result, the memory controller determines that execution of the first program operation has been completed.

At S706, in response to a power outage, the memory controller sends, to the memory, a set feature command comprising a first parameter indicating to enable a coarse data backup function of the memory.

At S708, the memory controller sends a third program operation command to the memory in a case that execution of the first program operation has been completed, wherein the third program operation command comprises the first data and a second address corresponding to the second memory cell. In an example, the third program operation is a single level cell program operation.

Figure 7B:
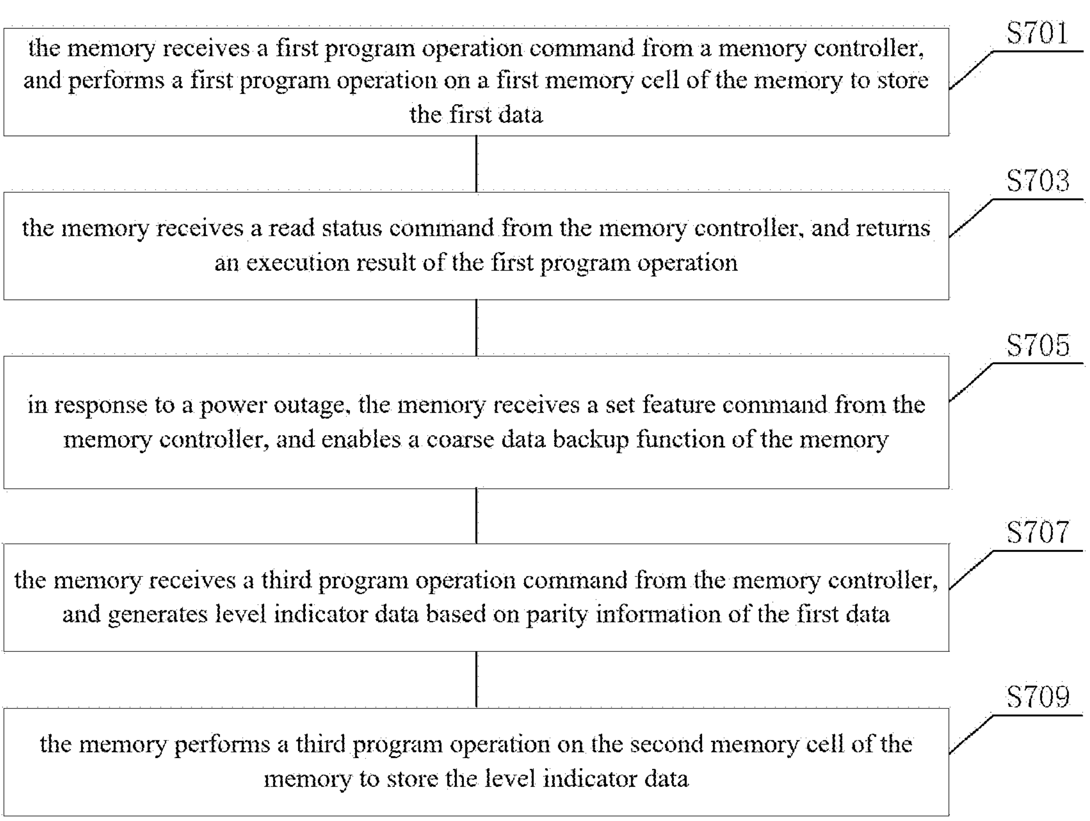
FIG. 7B illustrates a flowchart of an operating method of a memory according to an example of the present disclosure.

FIG. 7B illustrates a flowchart of an operating method of a memory according to an example of the present disclosure. In this example, when power outage occurs, the memory receives a set feature command to enable a coarse data backup function to perform the set power outage backup processing.

As shown in FIG. 7B, at S701, the memory receives a first program operation command comprising first data and a first address from a memory controller, and performs a first program operation on a first memory cell of the memory to store the first data. In an example, the first program operation corresponds to a first-pass programming operation in a two-pass programming operation.

At S703, the memory receives a read status command from the memory controller, and returns an execution result of the first program operation.

At S705, in response to a power outage, the memory receives a set feature command comprising a first parameter indicating to enable a coarse data backup function of the memory from the memory controller, and enables the coarse data backup function of the memory.

At S707, the memory receives a third program operation command from the memory controller, and generates level indicator data based on parity information of the first data. In an example, the XOR operation is performed on the parity information of data of each page of the first data to generate the level indicator data.

At S709, the memory performs a third program operation on the second memory cell of the memory to store the level indicator data. In an example, the third program operation is a single level cell program operation.

In an example, the physical addresses of the first memory cell and the second memory cell are correspondingly stored in a predetermined location of the memory.

In the above example, when the power outage occurs, the coarse data backup function of the memory is enabled by the set feature command in order to perform the power outage processing flow. For the first cell on which the first program operation has been performed and the second program operation has not yet performed, the second program operation would not be performed but the first data continues to be stored in the second memory cell through the third program operation, so that the processing speed is faster, and the processing flow is accurate and clear.

Figure 8:
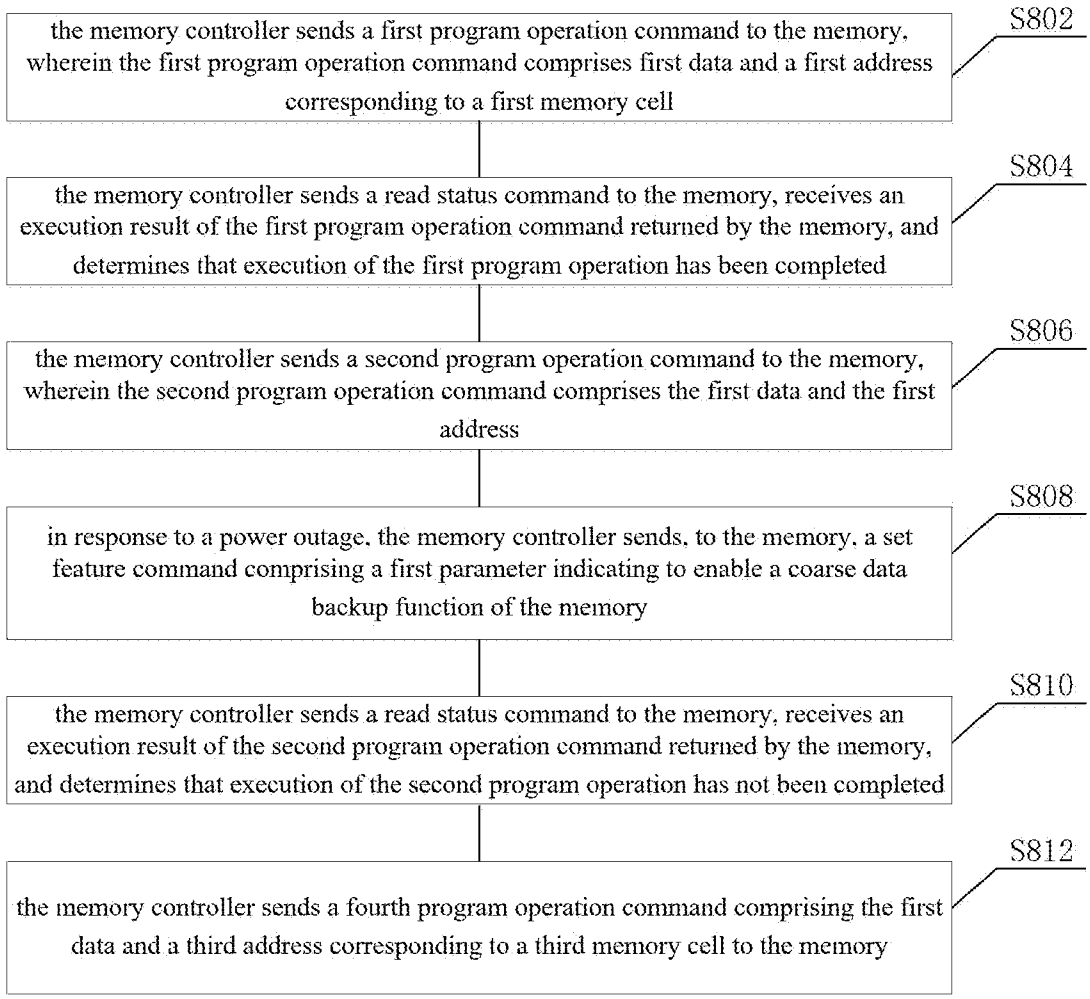
FIG. 8 illustrates a flowchart of an operating method of a memory controller according to another example of the present disclosure.

FIG. 8 illustrates a flowchart of an operating method of a memory controller according to another example of the present disclosure.

As shown in FIG. 8, at S802, the memory controller sends a first program operation command to the memory, wherein the first program operation command comprises first data and a first address, the first data is data to be stored to the memory based on a first program operation and a second program operation, and the first address corresponds to a first memory cell. In an example, the first program operation corresponds to a first-pass programming operation in a multi-pass programming operation.

At S804, the memory controller sends a read status command to the memory, and receives an execution result of the first program operation command returned by the memory. Based on the execution result, the memory controller determines that execution of the first program operation has been completed.

At S806, the memory controller sends a second program operation command to the memory, wherein the second program operation command comprises the first data and the first address. In an example, the second program operation corresponds to a second-pass programming operation in the multi-pass programming operation.

At S808, in response to a power outage, the memory controller sends, to the memory, a set feature command comprising a first parameter indicating to enable a coarse data backup function of the memory.

At S810, the memory controller sends a read status command to the memory, and receives an execution result of the second program operation command returned by the memory. Based on the execution result, the memory controller determines that execution of the second program operation has not been completed and stops the second program operation.

At S812, the memory controller sends a fourth program operation command to the memory, wherein the fourth program operation command comprises the first data and a third address corresponding to a third memory cell. In an example, the fourth program operation is a single level cell program operation.

In the foregoing example, when the power outage occurs during the second program operation is performed, the performance of the second program operation is stopped, the storage operation of the first data may be completed as soon as possible through a single level cell program operation, such that the backup of the first data can be completed faster, the time occupied by storing the first data is reduced, and the consumed resources are reduced.

Figure 9:
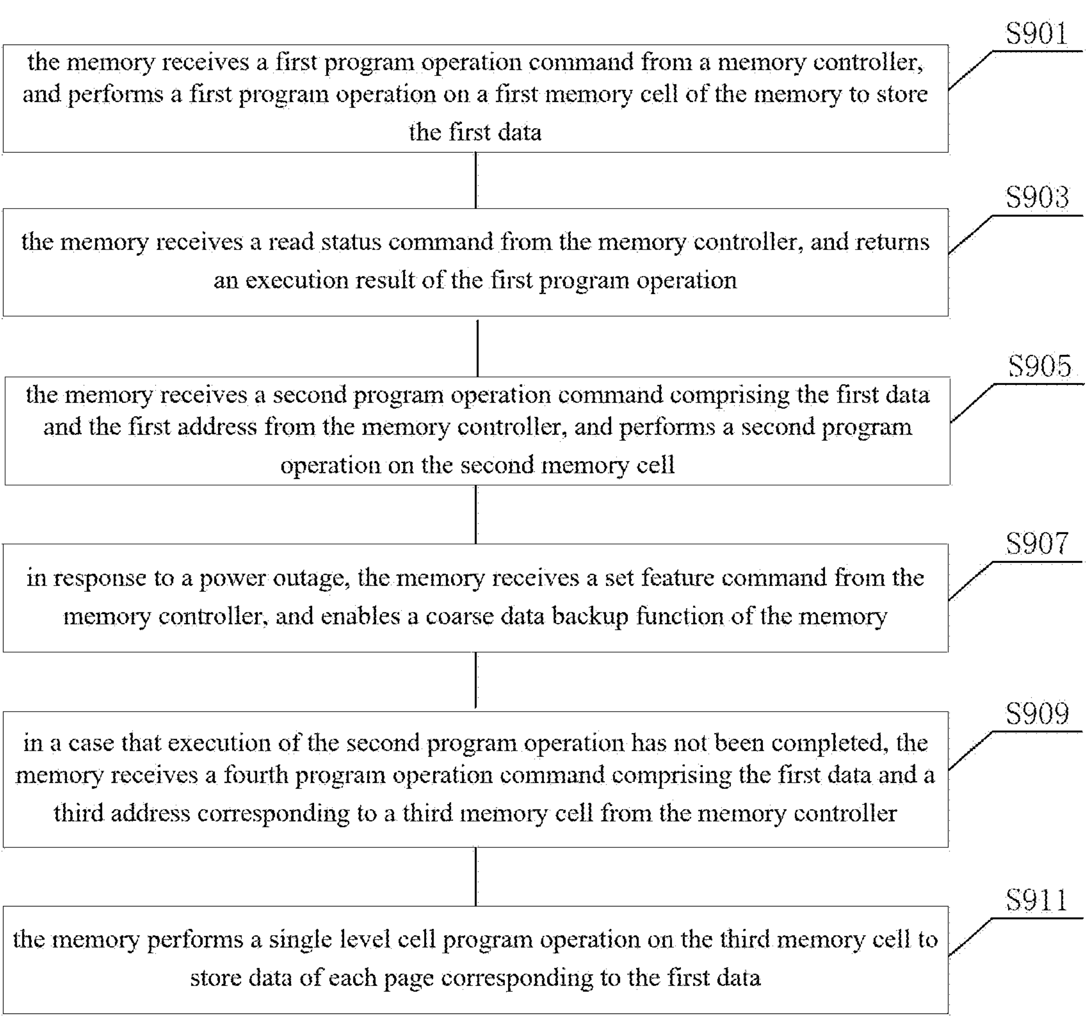
FIG. 9 illustrates a flowchart of an operating method of a memory according to another example of the present disclosure.

FIG. 9 illustrates a flowchart of an operating method of a memory according to another example of the present disclosure.

As shown in FIG. 9, at S901, the memory receives a first program operation command comprising first data and a first address from a memory controller, and performs a first program operation on a first memory cell of the memory to store the first data. In an example, the first program operation corresponds to a first-pass programming operation.

At S903, the memory receives a read status command from the memory controller, and returns an execution result of the first program operation.

At S905, the memory receives a second program operation command from the memory controller, and performs a second program operation on the first memory cell of the memory to store the first data. In an example, the second program operation corresponds to a fine program operation.

At S907, in response to a power outage, the memory receives a set feature command from the memory controller, and enables a coarse data backup function of the memory.

At S909, in a case that the second program operation has not been completed, the second program operation is stopped, and the memory receives a fourth program operation command comprising the first data and a third address corresponding to a third memory cell from the memory controller.

At S911, the memory performs a single level cell program operation on the third memory cell of the memory to store data of each page corresponding to the first data. In an example, the first data is TLC data and corresponds to data of 3 pages, then the first data is stored by 3 third memory cells. In an example, the first data is QLC data and corresponds to data of 4 pages, then the first data is stored by 4 third memory cells.

In the foregoing example, when the power outage occurs, for the memory cell on which the second program operation has not been performed, the second program operation would not be performed, but data of each page of the first data is stored through a single level cell program operation, such that the time required for performing the operation is short, the consumed resources are reduced, and thus ensuring to the data is stored accurately and timely.

Figure 10A:
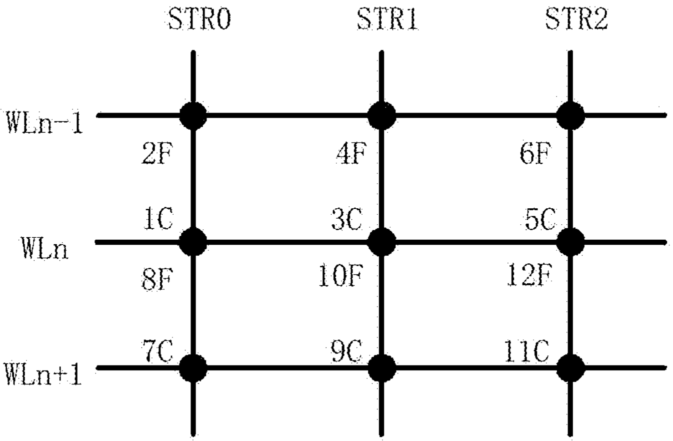
FIG. 10A illustrates a schematic diagram of a programmed state of a memory cell according to an example of the present disclosure.

FIG. 10A illustrates a schematic diagram of a programmed state of a memory cell according to an example of the present disclosure. As shown in FIG. 10A, the memory comprises a plurality of word lines WLn−1, WLn, WLn+1, and n is a natural number. Each word line comprises a plurality of strings STR0, STR1, STR2. Normally, a first-pass programming operation and a second-pass programming operation, such as a coarse program operation and a fine program operation, are performed in a zigzag order. In the figure, "C" represents a first-pass programming (e.g., coarse programming) operation and "F" represents a second-pass programming (e.g., fine programming) operation. The second-pass programming operations of 2F, 4F, and 6F have been performed (and the first-pass programming operations have also been completed) on strings STR0, STR1, STR2 on word line WLn−1; the first-pass programming operations of 1C, 3C, and 5C have been performed on and the second-pass programming operations of 8F, 10F, and 12F are being performed on strings STR0, STR1, STR2 on word line WLn; and the first-pass programming operations of 7C, 9C, and 11C have been performed on and the second-pass programming operations have not been performed on strings STR0, STR1, STR2 on word line WLn+1.

Figure 10B:
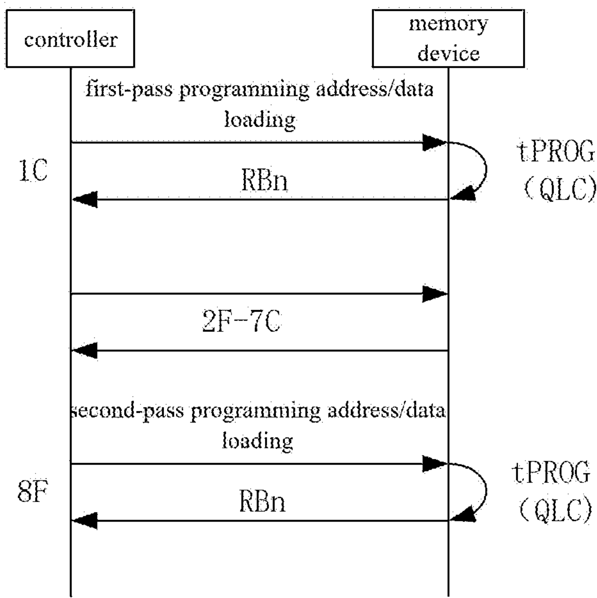
FIG. 10B illustrates a signaling diagram of a programmed state according to an example of the present disclosure according to FIG. 10A.

FIG. 10B illustrates a signaling diagram of a programmed state according to an example of the present disclosure according to FIG. 10A. As shown in FIG. 10B, the memory controller sends the first-pass programming operation command to the memory device in the order of 1C, 3C, 5C, 7C, 9C, and 11C, the memory device performs first-pass programming address/data loading, and returns the completion status RBn (Ready/Busy_n, R/B_n) of the program operation to the memory controller after the time of tPROG, respectively; the memory controller sends the second-pass programming operation command to the memory device in the order of 2F, 4F, 6F, 8F, 10F and 12F, the memory device performs second-pass programming address/data loading, and returns the completion status RBn of the program operation to the memory controller after the time of tPROG. In an example, R/B_n reflects the logical AND of SR [6] (bit 6 of state register) values for all LUNs on the respective NAND target or volume.

Figure 10C:
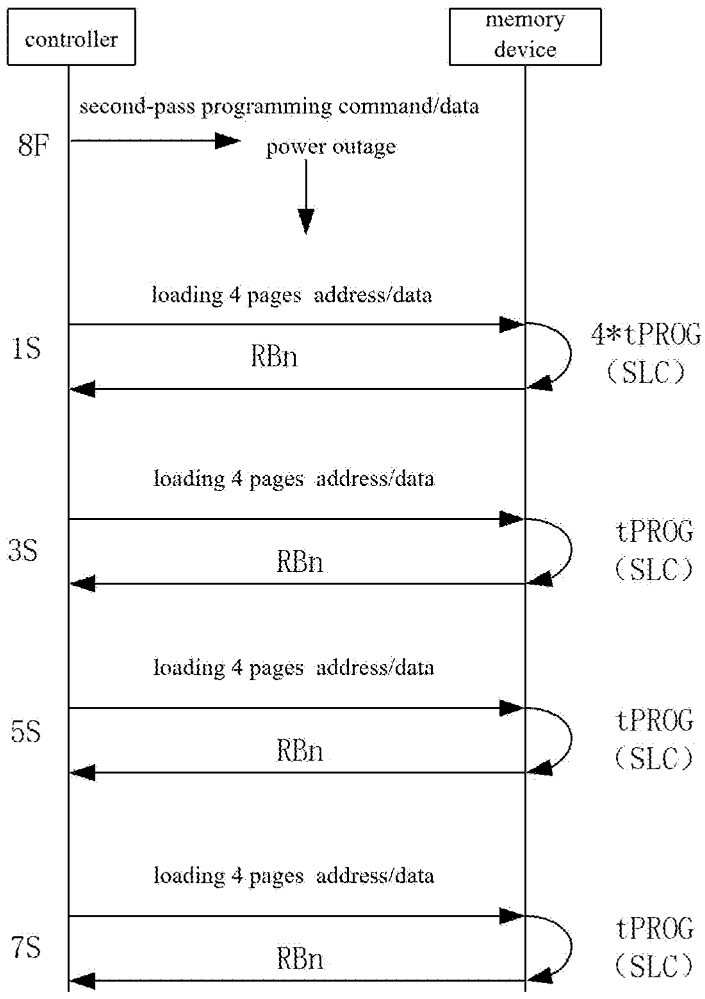
FIG. 10C illustrates a signaling diagram of a programmed state according to an example of the present disclosure according to FIG. 10A.

FIG. 10C illustrates a signaling diagram of a programmed state according to an example of the present disclosure according to FIG. 10A. When a power outage occurs, the worst case is that execution of the first-pass programming (coarse program) operations have been completed on all the strings on one word line WLn, and the power outage occurs when the second-pass programming is performed on the first string of the word line. Taking the 8F power outage in FIG. 10C as an example, the power outage occurs when the second-pass programming operation of 8F is performing on the STR0 of the word line WLn. For the 8F currently performing the second-pass programming operation, because it changes the VT (threshold voltage) distribution after the coarse program of 1C, it cannot be backed up with a level indicator data, then SLC programming is performed for each page (e.g., 4 pages in QLC) respectively, and the time of 4*tPROG (SLC) is consumed (operation IS). The second-pass programming has not been performed on the pages corresponding to 3C, 5C and 7C, and the data of these pages will be backed up. With the level indicator data programming according to the present disclosure, the memory controller inputs data of each page (for example, 4 pages in QLC), the NAND generates level indicator data according to data of each page, and performs SLC programming on the level indicator data (operations 3S, 5S, and 7S). The memory system employs a backup power supply (e.g., capacitor) to complete the SLC programming described above.

Figure 11:
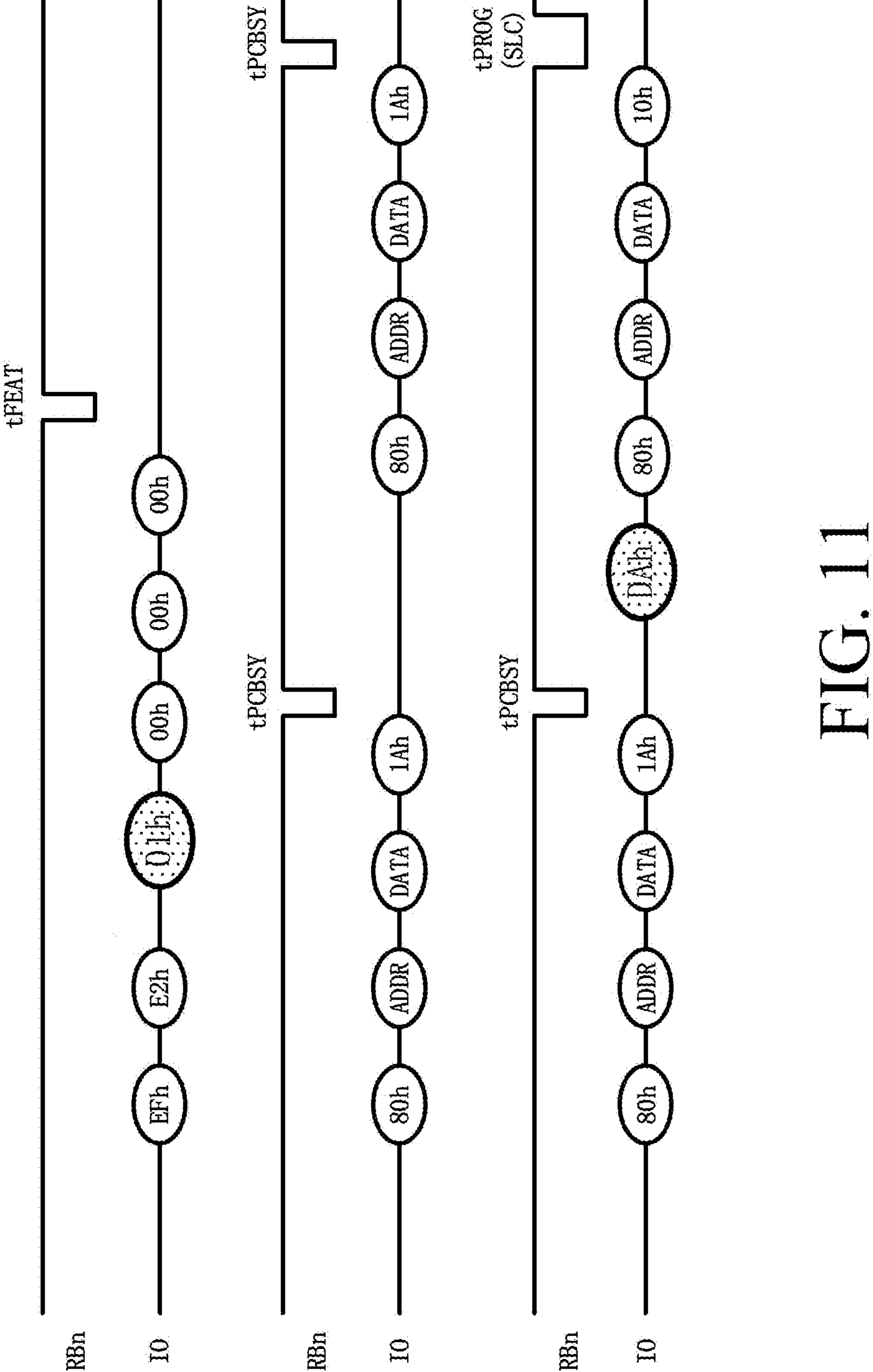
FIG. 11 illustrates a command sequence of an operating method of a memory according to an example of the present disclosure.

FIG. 11 illustrates a command sequence of an operating method of a memory according to an example of the present disclosure. As shown in FIG. 11, when power outage occurs, the memory controller sends a set feature command through which a coarse data backup function is enabled, for example, EFh E2h 01h 00h 00h 00h; and then sends data of each page to the NAND through the third program command, for example, sends the data of LP/MP/UP to the NAND through the command sequence 80h-1Ah, sends the data of XP to the NAND through the command Dah-80h-10h; the address in the command indicates the second address (physical address) corresponding to the level indicator data program, wherein the second address corresponds to the second memory cell. The level indicator data is stored by performing an SLC program operation on the second memory cell. In an example, the address in the Dah-80h-10h command indicates the second address; and in an example, the address of one of the 80h-1Ah commands indicates the second address.

The implementations of operations of the memory controller and the memory after power on are described below with reference to the accompanying drawings.

Figure 12:
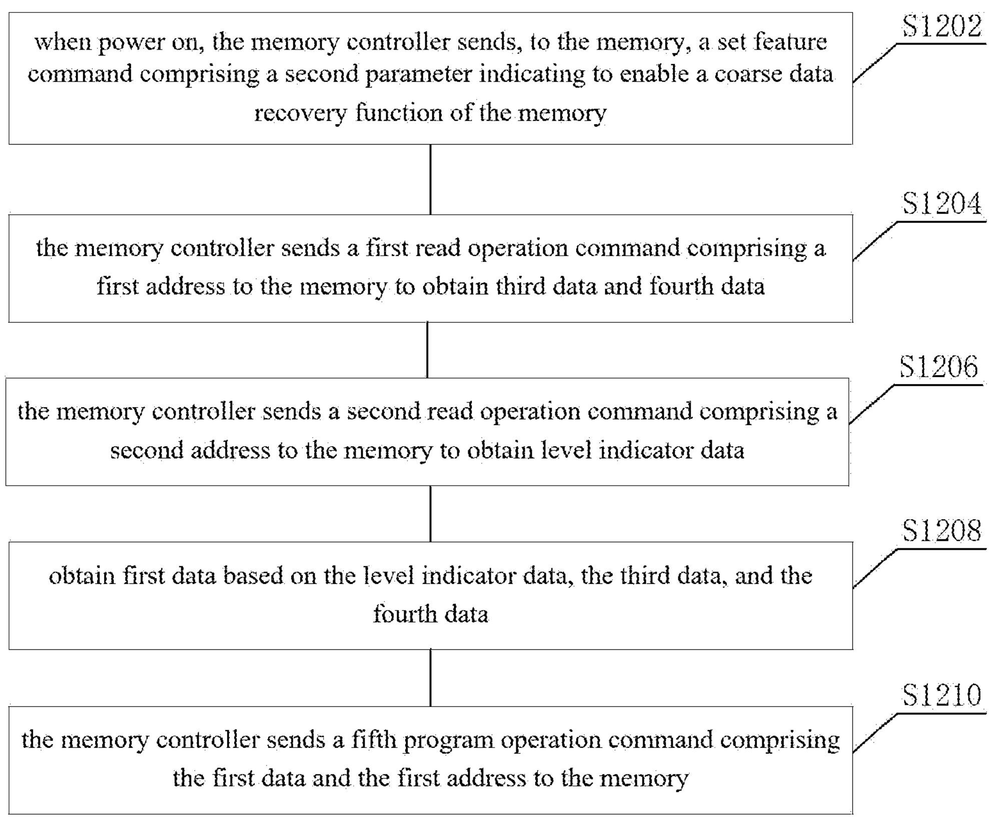
FIG. 12 illustrates a flowchart of an operating method of a memory controller according to still another example of the present disclosure.

FIG. 12 illustrates a flowchart of an operating method of a memory controller according to still another example of the present disclosure.

As shown in FIG. 12, at S1202, when power on, the memory controller sends, to the memory, a set feature command comprising a second parameter indicating to enable a coarse data recovery function of the memory.

At S1204, the memory controller sends a first read operation command comprising a first address corresponding to a first memory cell to the memory to obtain third data and fourth data. After power on, the memory controller may read, from the predetermined location of the memory, the first address and the second address corresponding to the data that needs to be recovered.

At S1206, the memory controller sends a second read operation command comprising a second address corresponding to a second memory cell to the memory to obtain level indicator data.

At S1208, obtaining the first data based on the level indicator data, the third data, and the fourth data. In an example, when the level indicator data indicates an odd state, the third data is used as the first data; and when the level indicator data indicates an even state, the fourth data is used as the first data. Obtaining the first data based on the level indicator data, the third data, and the fourth data is described below in detail with reference to the figures.

In an example, the method further comprises: at S1210, sending, by the memory controller, a fifth program operation command comprising the first data and the first address to the memory, such that the memory performs the second program operation on the first memory cell to store the first data. That is, after power on, the second program operation may be performed on the original first memory cell to complete storage of the first data.

In the foregoing example, when power on, the third data and the fourth data are read from the first memory cell through the first address, and the level indicator data is read from the second memory cell through the second address, so that the first data is recovered based on the level indicator data, the third data, and the fourth data, thereby ensuring data recovery.

In an example, after obtaining the recovered first data, the memory controller sends a sixth program operation command comprising the first data and a fourth address corresponding to a fourth memory cell to the memory. The memory receives a sixth program operation command from the memory controller, and performs a program operation on the fourth memory cell to store the first data. The first data is stored to the fourth memory cell different from the first memory cell.

Figure 13:
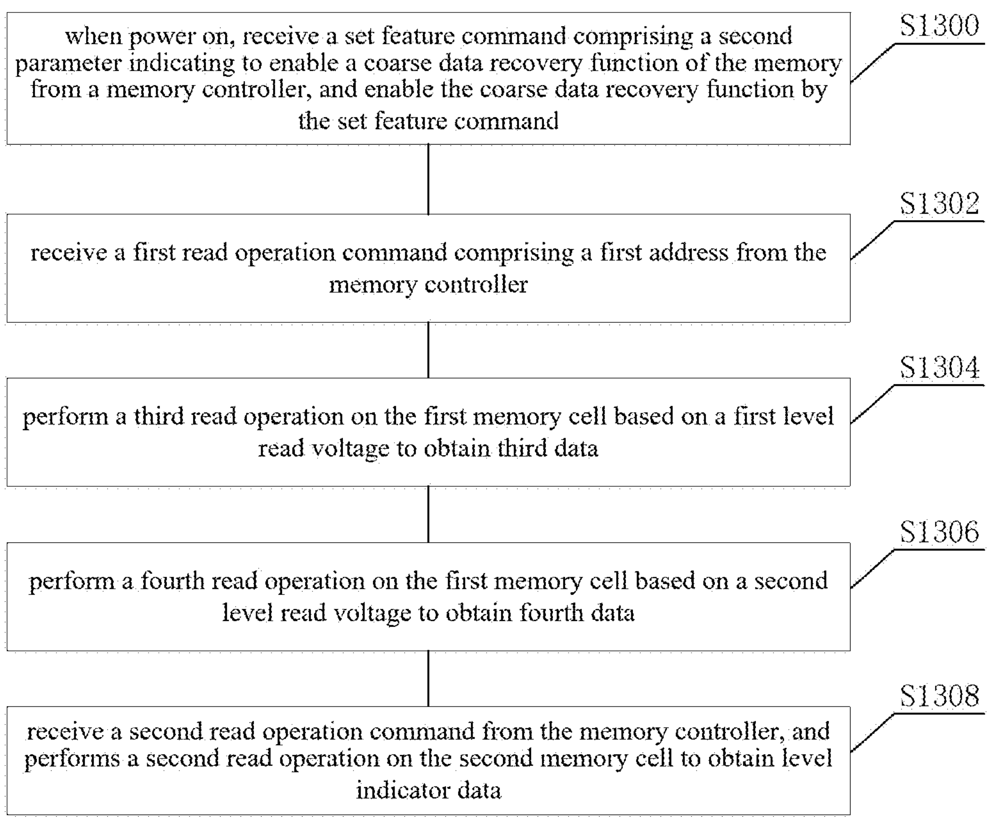
FIG. 13 illustrates a flowchart of an operating method of a memory according to still another example of the present disclosure.

FIG. 13 illustrates a flowchart of an operating method of a memory according to still another example of the present disclosure.

As shown in FIG. 13, at S1302, when power on, the memory receives a set feature command sent by a memory controller comprising a second parameter indicating to enable a coarse data recovery function of the memory.

At S1302, the memory receives a first read operation command comprising a first address corresponding to a first memory cell from the memory controller.

At S1304, the memory performs a third read operation on the first memory cell based on a first level read voltage to obtain third data. The first level read voltage is a read voltage determined according to a voltage distribution in an odd state.

At S1306, the memory performs a fourth read operation on the first memory cell based on a second level read voltage to obtain fourth data. The second level read voltage is a read voltage determined according to a voltage distribution in an even state.

At S1308, the memory receives a second read operation command comprising a second address corresponding to a second memory cell from the memory controller, and performs a second read operation on the second memory cell to obtain level indicator data.

In an example, the order of operation S1308 and operation S1302 can be swapped, that is, the second read operation command is sent first, and then the first read operation command is sent. The corresponding command sequence may be described in connection with FIG. 14 below.

In the above example, the threshold voltage distribution after the first program operation is read from the first memory cell through the first read operation command, then the level indicator data is read from the second memory cell through the second read operation command, thus the backup third data, the fourth data and the level indicator data are obtained for recovery of the first data.

In an example, when power on, the memory receives a set feature command comprising a second parameter indicating to enable a coarse data recovery function of the memory from the memory controller, thereby enables the coarse data recovery function. Then, the memory may read the first address and the second address from the predetermined location of the memory, read the third data, the fourth data, and the level indicator data based on the first address and the second address, and recover the first data. In this example, related operations may be performed by the memory, thereby saving resources of the memory controller.

Figure 14:
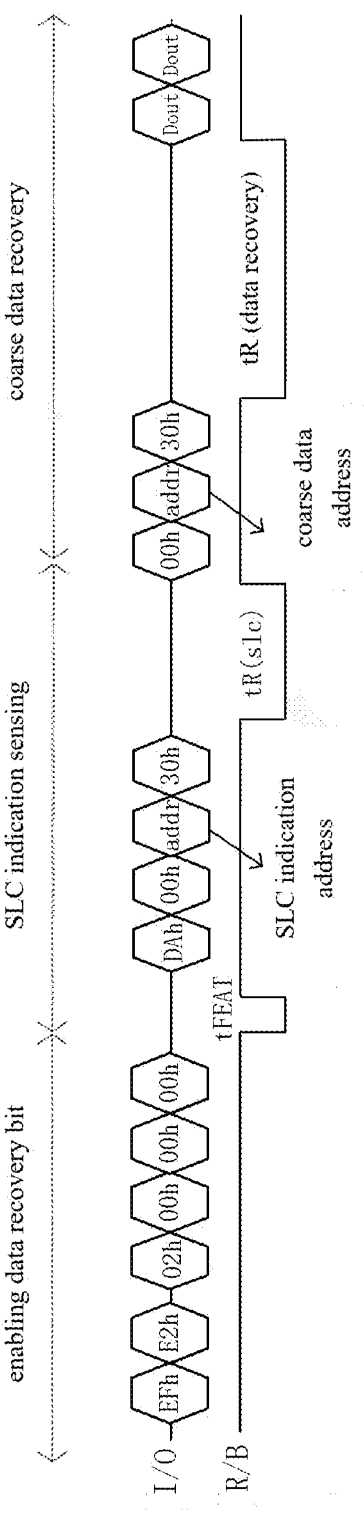
FIG. 14 illustrates a command sequence of an operating method of a memory according to an example of the present disclosure.

FIG. 14 illustrates a command sequence of an operating method of a memory according to an example of the present disclosure. As shown in FIG. 14, in the stage of enabling data recovery bit, a set feature command is sent, for example, EFh E2h 02h 00h 00h 00h; in the stage of SLC indication sensing, a second read operation command is sent, for example, Dah 00h addr2 30h, wherein the second read operation command comprises a second address addr2 corresponding to the second memory cell; in the stage of coarse data recovery, a first read operation command is sent, for example, 00h addr1 30h, wherein the first read operation command comprises the first address addr1.

Figure 15A:
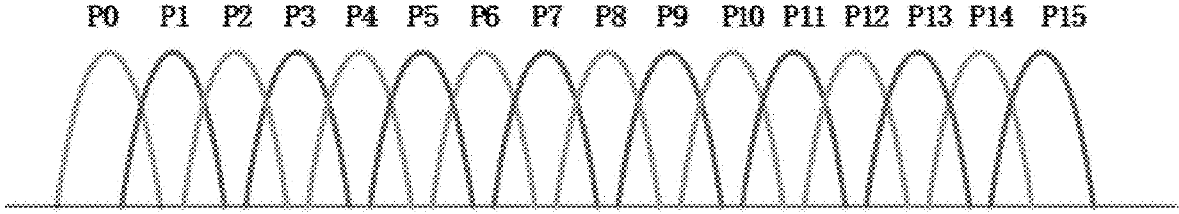
FIG. 15A illustrates a threshold voltage distribution diagram after a first programming according to an example of the present disclosure.

FIG. 15A illustrates a threshold voltage distribution diagram after a first program operation according to an example of the present disclosure. In this example, the threshold voltage of the QLC memory cell is taken as an example for illustration. As shown in FIG. 15A, after performing the first program operation (the first-pass programming operation, such as the coarse programming operation), the threshold voltage distribution of different programmed states of the QLC memory cell is shown in FIG. 15A, with an overlap between adjacent programmed states (Pn, Pn+1).

As shown in FIG. 15B, the programmed states after the first program operation are separated by the odd-even state, wherein the level indicator data of the even programmed states is set to 0, and the level indicator data of the odd programmed states is set to 1.

Figure 15C:
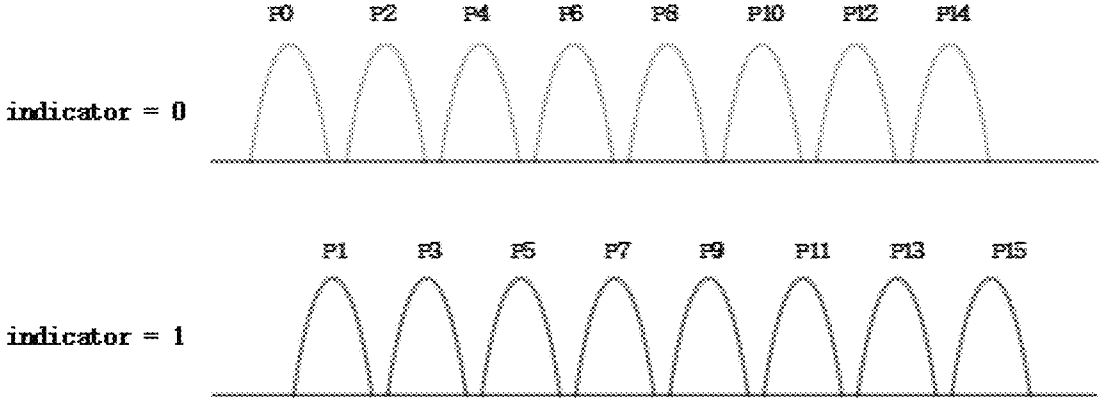
FIG. 15C illustrates a threshold voltage distribution diagram separated according to the odd-even state after first programming according to an example of the present disclosure.

FIG. 15C illustrates a threshold voltage distribution diagram separated according to the odd-even state after first program operation according to an example of the present disclosure. For the threshold voltage distribution of the different programmed states shown in FIG. 15A, if the programmed states after the first program operation are separated according to the odd-even state, as shown in FIG. 15C, separation is achieved between the programmed states P0, . . . , P14 in the even state, and separation is achieved between the programmed states P1, . . . , P15 in the odd state.

Figure 16:
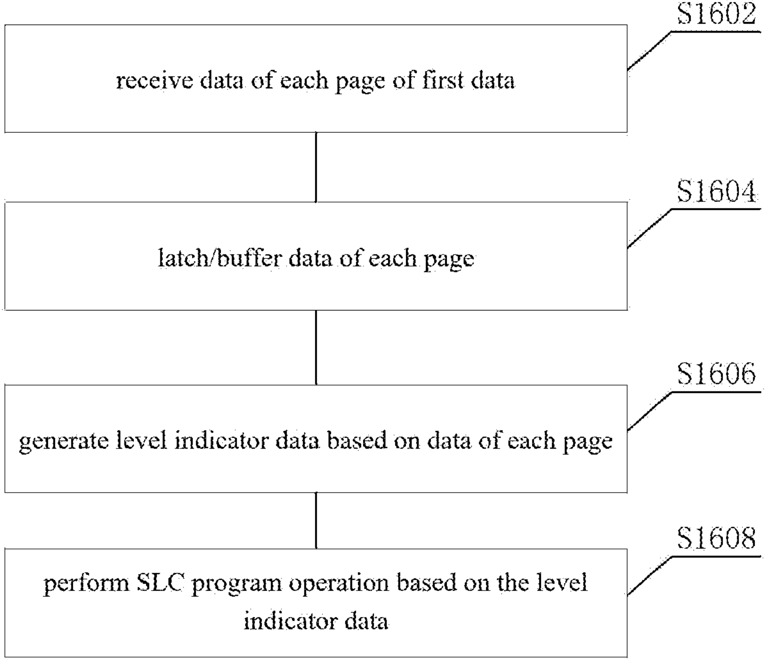
FIG. 16 illustrates a flowchart of an operating method of a memory according to still another example of the present disclosure.

FIG. 16 illustrates a flowchart of an operating method of a memory according to an example of the present disclosure. The operation processing will be described with reference to the page buffer in FIG. 5.

As shown in FIG. 16, at S1602, the memory receives data of each page of the first data from the memory controller. For example, for a QLC memory cell, the command sequence shown in FIG. 11 may be used to receive data of a total of 4 pages, LP, MP, UP, and XP.

At S1604, the memory latches or buffers data of each page. After receiving the data of each page, the memory buffers data of each page in an internal data latch of the page buffer of the peripheral circuit, such as D1, . . . , DN-1 and DC latch in the page buffer in FIG. 5, or stores the data in a cache of the peripheral circuit.

At S1606, the memory generates level indicator data based on data of each page. The peripheral circuit generates corresponding 1-page level indicator data based on data of N pages (e.g., N bits of data). For example, FIG. 17 illustrates 4 bits of data (with 16 values represented in Gray Code) according to an example of the present disclosure. For each of the 16 values, the level indicator data DL is generated as parity for the corresponding 4 bits of binary value (e.g., LP, MP, UP, and XP). For example, for the LV0 value (1, 1, 1, 1) in FIG. 17, the level indicator data DL is 0, that is, the parity of (1, 1, 1, 1). In some examples, 1-page level indicator data may be temporarily stored in an internal latch of a page buffer, e.g., DL 504 of FIG. 5, which is typically configured to store 3 BL bias information.

At S1608, the peripheral circuit performs a single level cell program operation on the 1-page level indicator data to store the level indicator data in a memory cell with a predetermined address (for example, the first cell) in the memory cell array.

In the above example, the generation and programming storage operation of the level indicator data of the first data is completed by using the latch by the peripheral circuit, so that the implementation is convenient, and the programming efficiency is improved.

Figure 18:
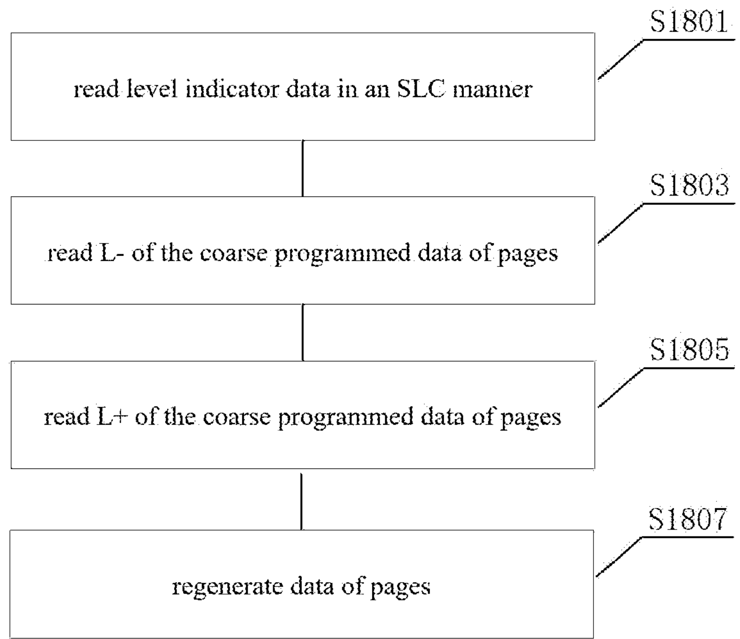
FIG. 18 illustrates a flowchart of an operating method of a memory according to an example of the present disclosure.

FIG. 18 illustrates a flowchart of an operating method of a memory according to an example of the present disclosure.

As shown in FIG. 18, at S1801, the memory reads the level indicator data in an SLC manner. In an example, a peripheral circuit of the memory performs an SLC read operation to read the level indicator data stored in the memory cell array, e.g., level indicator data DL in FIG. 19B.

At S1803, L− of the coarse programmed data of pages is read. In an example, the peripheral circuit performs a first read operation based on a multi-level cell (e.g., based on QLC, if N=4) to read the coarse programmed data of N pages from the memory cell array as L− (e.g., the third data). In some examples, given a set of gray codes, each gray code represents N-bit data corresponding to data of the N pages, in order to read the nth value of the $2^N$ values corresponding to the N-bit data in the first read operation, the peripheral circuit sets the read voltage to a first value (e.g., a first level read voltage) which equals to the center of the threshold voltage distribution of the (n−1)th value of the $2^N$ values.

At S1805, L+ of the coarse programmed data of pages is read. In an example, the peripheral circuit performs a second read operation based on a multi-level cell (e.g., based on QLC, if N=4) to read the coarse programmed data of N pages from the memory cell array as L+ (e.g., the fourth data). In some examples, given a set of gray codes, each gray code represents N-bit data corresponding to data of the N pages, in order to read the nth value of the $2^{N}$ values corresponding to the N-bit data in the second read operation, the peripheral circuit sets the read voltage to a second value (e.g., a second level read voltage) which equals to the center of the threshold voltage distribution of the nth value of the $2^N$ values.

At S1807, data of each page is regenerated based on the level indicator data, the L− and the L+.

In the above example, in the case of a QLC memory cell, the recovery time of data of pages=2tR_qlc+tR_slc. That is, 2 read times of QLC and 1 read time of SLC.

The implementations of reading data in FIG. 18 are described below with reference to FIGS. 19A and 19B.

Figure 19:
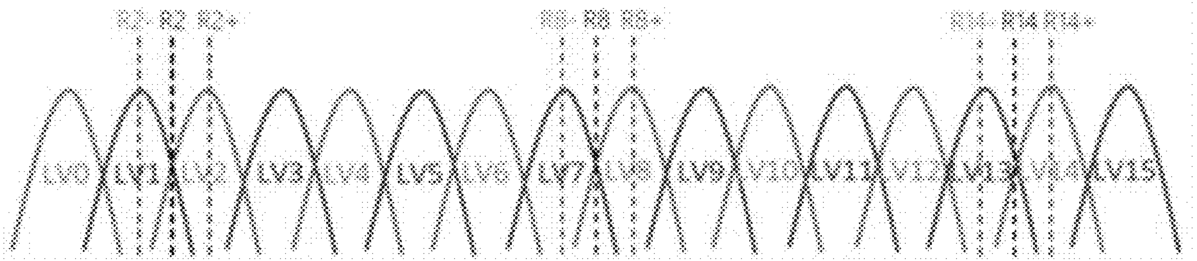
FIG. 19A illustrates a schematic diagram of selecting a first read voltage and a second read voltage according to an example of the present disclosure.
FIG. 19B illustrates an example of DL, L−, L+, and regenerated LP data according to an example of the present disclosure.

FIG. 19A illustrates example read voltages when reading L− and L+ described above at S1803 and S1805 according to an example of the present disclosure. FIG. 19A sets the read voltage to read the L− and L+ so as to reconstruct the LP data shown in FIG. 19B. For example, to perform the first read operation to read the third value (e.g., LV2) of the 16 values of 4-bit data, the peripheral circuit sets the read voltage R2− to the center of the threshold voltage distribution of the second value (e.g., LV1) of the 16 values. As another example, to perform the second read operation to read the third value (e.g., LV2) of the 16 values of the 4-bit data, the peripheral circuit sets the read voltage R2+ to the center of the threshold voltage distribution of the third value (e.g., LV2) of the 16 values. As shown in FIG. 19A, read voltages of R8−, R8+, R14−, and R14+ can be similarly set.

FIG. 19B illustrates an example of DL, L−, L+, and regenerated LP data according to an example of the present disclosure. Original LP data in data of 4 pages (LP, MP, UP, and XP) is shown in FIG. 17. As described above at S1807, the peripheral circuit regenerates LP data by performing a logical operation of ~DL&L−+DL&L+. FIG. 19B shows that the regenerated LP data in the last column in FIG. 19B matches the LP data in FIG. 17. In some examples, the MP, UP, and XP data may be recovered in a manner similar to the regenerated LP data shown in FIG. 19B. When each of the MP, UP, and XP data is regenerated, the corresponding L− and L+ may be different from the L− and L+ shown in FIG. 19B, and may be obtained from a Gray code associated with the N-bit data of the LP, MP, UP, XP data, such as the Golay code in FIG. 17. The logical operations for regenerating each of the MP, UP, and XP data may be the same or different than the logical operations for the LP data described above.

Figure 20:
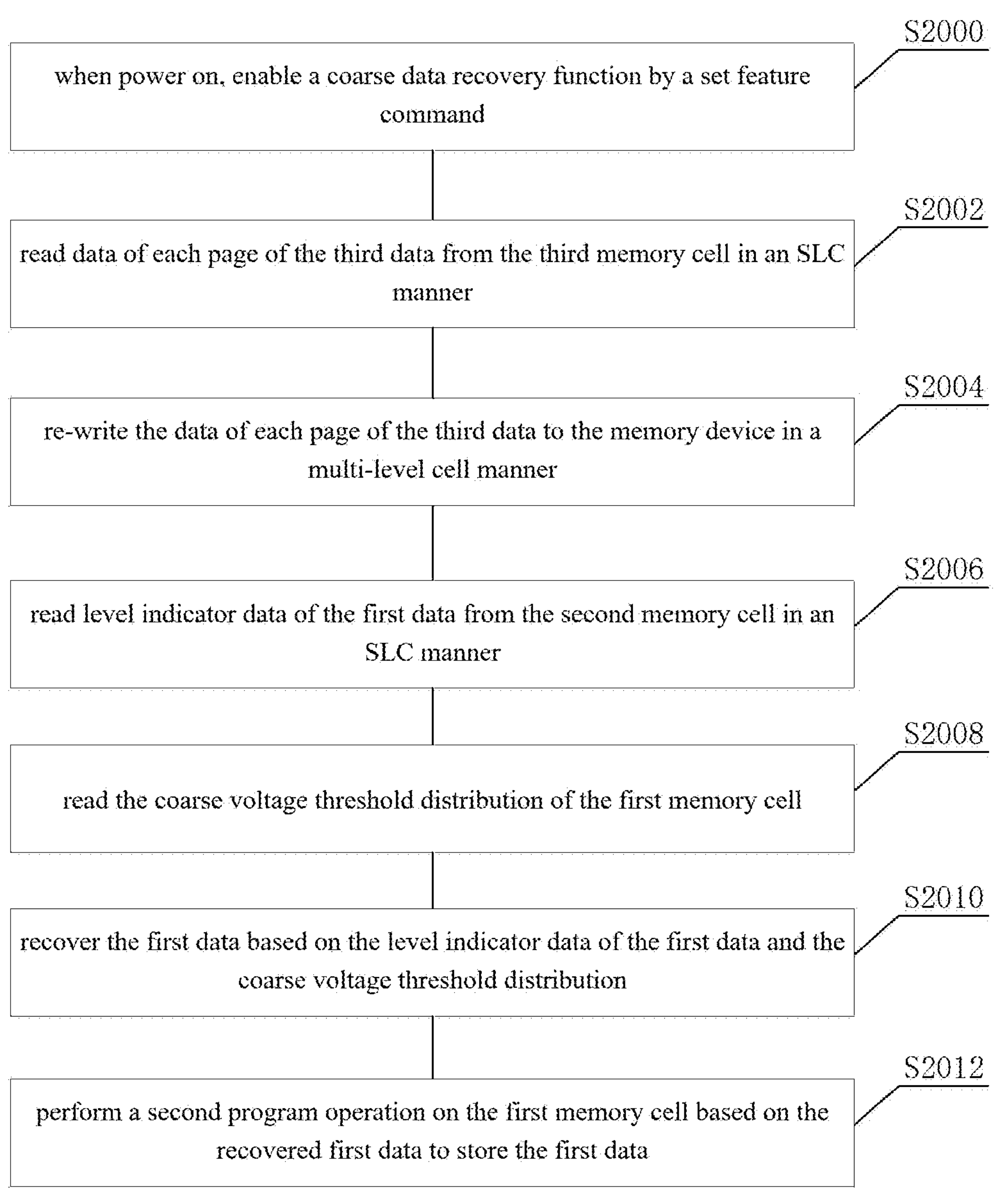
FIG. 20 illustrates a flowchart of an operating method of a memory system according to an example of the present disclosure.

FIG. 20 illustrates a flowchart of an operating method of a memory according to an example of the present disclosure.

As shown in FIG. 20, at S2000, when power on, the coarse data recovery function is enabled by a set feature command.

At S2002, the memory reads data of each page of the third data from the third memory cell in an SLC manner. The third data refers to N-bit data that stores data of each page in SLCs.

At S2004, re-writing the data of each page of the third data to the memory device in a multi-level cell manner.

At S2006, the memory reads level indicator data of the first data from the second memory cell in the SLC manner.

At S2008, the memory reads the coarse voltage threshold distribution of the first memory cell. For example, L− and L+ of the coarse programed data of pages are read using S1803 and S1805 shown in FIG. 18.

At S2010, the memory recovers the first data based on the level indicator data of the first data and the coarse voltage threshold distribution.

At S2012, the memory performs a second program operation on the first memory cell based on the recovered first data to store the first data.

In the above example, by reconstructing data of N pages from the stored level indicator data and the coarse programmed data of N pages, the peripheral circuit does not need to obtain data of N pages from the memory controller after the coarse programming of data of N pages and before the fine programming of information of N pages. Storage resources of the memory controller may be saved.

Table 1 below compares the amount of data/time/consumption space for different power outage data backup schemes:

TABLE 1

| QLC write-through 2-Pass programming, sawtooth | | |
|---|---|---|
| Scheme | Formula | Worst case (* 8 planes) |
| 4-16 | 4 page * 1 string | 32 Page/Die |
| 16-16 | 4 page * (8 + 1) string | 288 Page/Die |
| ✓ 2 page CDRB | 4 page + 2 page * 8 string | 160 Page/Die |
| 1 page ind in HOST | 4 page + 1 page * 8 string | 96 Page/Die |
| 2 page ind in HOST | 4 page + 2 page * 8 string | 160 Page/Die |
| 1 page ind in NAND always | 4 page * 1 string -> 32 Page/Die<br>Cost: 1*4k/160k = 2.5% NVB | |
| 2 page ind in NAND always | 4 page * 1 string -> 32 Page/Die<br>Cost: 2*4k/160k = 5% NVB | |
| 1 page ind in NAND @ pwr loss | 4 page + 1 page * 8 string -> 96 Page/Die<br>Time cost ~86 us/die: indicator gen ~6 us + data transfer(3.6 G) <10 us | |
| 2 page ind in NAND @ pwr loss | 4 page + 2 page * 8 string -> 160 Page/Die<br>Time cost ~92 us/die: indicator gen ~12 us + data transfer(3.6 G) <10 us | |

The space and time consumed by the technical solutions of the present disclosure are shown in Table 1 for a die architecture with 8 strings and 8 planes. As can be seen from Table 1, the solutions of the present disclosure have a great advantage.

According to the technical solution of the present disclosure, the power outage backup time can be reduced, the power outage backup space can be reduced, and the performance during normal operation is not affected, such as tR/tPROG/Error Summary (ESUM) parameters and the like.

In the examples, a computer readable storage medium comprising an instruction is also provided, e.g., the controller memory comprising an instruction, wherein the instruction is executable by the controller processor of the memory controller to implement the methods described above. Alternatively, the computer readable storage medium may be a ROM, a random access memory (RAM), a CD-ROM, a magnetic tape, a floppy disk, and an optical data memory, etc.

In the examples, a computer program product comprising a computer program/instruction is also provided, wherein the computer program/instruction, when executed by a processor, implements the method in the examples described above.

It is to be understood that, a reference to "some examples" throughout the specification means that particular features, structures, or characteristics related to an example are comprised in at least one example of the present disclosure. Thus, the appearances of the phrase "in some examples" or "in some other examples" everywhere throughout this specification do not necessarily refer to the same examples. In addition, these particular features, structures or characteristics may be combined in one or more examples in any proper manner. It is to be understood that, in various examples of the present disclosure, sequence numbers of the above processes do not indicate an execution sequence, and an execution sequence of various processes shall be determined by functionalities and intrinsic logics thereof, and shall not constitute any limitation to the implementation processes of the examples of the present disclosure. The above sequence numbers of the examples of the present disclosure are used for description only, and do not represent goodness and badness of the examples.

It is to be noted that, the terms "comprise", "include", or any variants thereof herein are intended to cover non-exclusive inclusion, such that a process, a method, an article, or an apparatus comprising a series of elements not only comprises those elements, but also comprises other elements not listed explicitly, or elements inherent to this process, method, article, or apparatus. An element defined by a statement "comprising one" do not preclude the presence of another identical element in the process, method, article or apparatus comprising this element, without more limitations.

In several examples provided by the present disclosure, it is to be understood that the disclosed device and method may be implemented in other manners. The device examples described above are illustrative only, for example, the division of units is merely a logical functional division. In a practical implementation, there may be another manner for division. For example, a plurality of units or components may be combined, or may be integrated into another system, or some features may be ignored or not performed. In addition, the coupling or direct coupling or communicative connection between various constituent parts as shown or as discussed may be through some interfaces, and indirect coupling or communicative connection of devices or units may be electrical, mechanical or in other forms.

The above-mentioned units described as separate components may or may not be physically separated. The components shown as units may or may not be physical units. They may be located in one place, or may be distributed onto a plurality of network units. According to actual needs, part or all of the units may be selected for realizing the purposes of the solutions of the examples.

In addition, various functional units in various examples of the present disclosure may be all integrated into one processing unit, or each functional unit may serve as one unit individually, or two or more functional units may be integrated into one unit. The above-mentioned integrated unit may be implemented in a hardware form or in a form of hardware and software functional units.

Examples of the present disclosure provide a memory system, a memory controller, a memory (memory device), an operating method, a computer readable storage medium, and a computer program product.

According to an aspect of the examples of the present disclosure, there is provided a memory system, comprising: a memory comprising a memory cell array and a peripheral circuit coupled to the memory cell array; and a memory controller coupled to the memory, wherein the memory controller is configured to: send a first program operation command to the memory, wherein the first program operation command comprises first data and a first address, the first data is data to be stored to the memory based on a first program operation and a second program operation, and the first address corresponds to a first memory cell; and in response to a power outage, send a third program operation command to the memory in a case that execution of the first program operation has been completed, wherein the third program operation command comprises the first data and a second address corresponding to a second memory cell; and the peripheral circuit is configured to: receive the first program operation command from the memory controller to perform the first program operation on the first memory cell of the memory to store the first data; receive the third program operation command from the memory controller to generate a level indicator data based on the first data; and perform a third program operation on the second memory cell of the memory to store the level indicator data.

In an example, the peripheral circuit is configured to: generate the level indicator data based on parity information of the first data.

In an example, the peripheral circuit is configured to: perform an XOR operation on the parity information of data of each page of the first data to generate the level indicator data.

In an example, the peripheral circuit is configured to: perform a single level cell program operation on the second memory cell of the memory to store the level indicator data.

In an example, the memory controller is further configured to: send a second program operation command comprising the first data and the first address to the memory; in response to the power outage, send a fourth program operation command to the memory in a case that execution of the second program operation command has not been completed, wherein the fourth program operation command comprises the first data and a third address corresponding to a third memory cell; and the peripheral circuit is configured to: receive the second program operation command from the memory controller to perform the second program operation command on the first memory cell of the memory to store the first data; and receive the fourth program operation command from the memory controller to perform a single level cell program operation on the third memory cell of the memory to store data of each page corresponding to the first data.

In an example, the memory controller is configured to: in response to the power outage, send, to the memory, a set feature command comprising a first parameter indicating to enable a coarse data backup function of the memory; and the peripheral circuit is configured to: receive the set feature command from the memory controller to enable the coarse data backup function of the memory.

In an example, the first memory cell comprises a triple-level cell (TLC) or a quad-level cell (QLC).

In an example, the memory controller is configured to: when power on, send, to the memory, a set feature command comprising a second parameter indicating to enable a coarse data recovery function of the memory; send a first read operation command comprising the first address to the memory to obtain third data and fourth data; send a second read operation command comprising the second address to the memory to obtain the level indicator data; and obtain the first data based on the level indicator data, the third data, and the fourth data; and the peripheral circuit is configured to: receive the first read operation command from the memory controller, to perform a third read operation on the first memory cell based on a first level read voltage to obtain the third data and, and to perform a fourth read operation on the first memory cell based on a second level read voltage to obtain the fourth data; and receive the second read operation command from the memory controller to perform a second read operation on the second memory cell to obtain the level indicator data.

In an example, the memory controller is configured to: send a fifth program operation command comprising the first data and the first address to the memory; and the peripheral circuit is configured to: receive the fifth program operation command from the memory controller to perform the second program operation on the first memory cell to store the first data.

In an example, the memory controller is configured to: send a sixth program operation command comprising the first data and a fourth address corresponding to a fourth memory cell to the memory; and the peripheral circuit is configured to: receive the sixth program operation command from the memory controller to perform a program operation on the fourth memory cell to store the first data.

In an example, the first level read voltage is a read voltage determined according to a voltage distribution in an odd state; and the second level read voltage is a read voltage determined according to a voltage distribution in an even state.

In an example, the memory controller is configured to: use the third data as the first data when the level indicator data indicates an odd state; and use the fourth data as the first data when the level indicator data indicates an even state.

In an example, the memory controller is configured to: after sending the first program operation command to the memory, send a read status command to the memory to obtain an execution result of the first program operation; and determine whether execution of the first program operation has been completed based on the execution result of the first program operation.

In an example, the memory system further comprises a backup power supply for providing power to the memory system when a power outage occurs.

In an example, the backup power supply comprises a capacitor.

According to another aspect of the present disclosure, there is provided a memory controller, comprising: a controller memory configured to store a control instruction; and a controller processor coupled to the controller memory and configured to execute the control instruction to perform processing comprising: sending a first program operation command comprising first data and a first address to a memory, wherein the first data is data to be stored to the memory based on a first program operation and a second program operation, and the first address corresponds to a first memory cell; in response to a power outage, sending a third program operation command comprising the first data and a second address to the memory in a case that execution of the first program operation has been completed, wherein the second address corresponds to a second memory cell, such that the memory generates level indicator data based on the first data, and performs a third program operation on the second memory cell to store the level indicator data.

In an example, the processing comprises: generating the level indicator data based on parity information of the first data.

In an example, the third program operation comprises a single level cell program operation.

In an example, the processing comprises: sending a second program operation command comprising the first data and the first address to the memory; in response to the power outage, sending a fourth program operation command comprising the first data and a third address to the memory in a case that execution of the second program operation has not been completed, wherein the third address corresponds to a third memory cell, such that the memory performs a single level cell program operation on the third memory cell to store data of each page corresponding to the first data.

In an example, the processing comprises: in response to the power outage, sending, to the memory, a set feature command comprising a first parameter indicating to enable a coarse data backup function of the memory.

In an example, the first memory cell comprises a triple-level cell (TLC) or a quad-level cell (QLC).

In an example, the processing comprises: when power on, sending, to the memory, a set feature command comprising a second parameter indicating to enable a coarse data recovery function of the memory; sending a first read operation command comprising the first address to the memory to obtain third data and fourth data; sending a second read operation command comprising the second address to the memory to obtain the level indicator data; and obtaining the first data based on the level indicator data, the third data, and the fourth data.

In an example, the processing comprises: sending a fifth program operation command comprising the first data and the first address to the memory, such that the memory performs the second program operation on the first memory cell to store the first data.

In an example, the processing comprises: sending a sixth program operation command comprising the first data and a fourth address corresponding to a fourth memory cell to the memory, such that the memory performs a program operation on the fourth memory cell to store the first data.

In an example, the processing comprises: after sending the first program operation command to the memory, sending a read status command to the memory to obtain an execution status of the first program operation; and determining whether execution of the first program operation has been completed based on the execution status of the first program operation.

In an example, the obtaining the first data based on the level indicator data, the third data, and the fourth data comprises: using the third data as the first data when the level indicator data indicates an odd state; and using the fourth data as the first data when the level indicator data indicates an even state.

In an example, the memory controller further comprises a backup power supply for providing power to the memory system when a power outage occurs.

In an example, the backup power supply comprises a capacitor.

According to another aspect of the present disclosure, there is provided a memory, comprising: a memory cell array; and a peripheral circuit coupled to the memory cell array and configured to: receive a first program operation command comprising first data and a first address from a memory controller, wherein the first data is data to be stored to the memory based on a first program operation and a second program operation, and the first address corresponds to a first memory cell; perform the first program operation on the first memory cell to store the first data; in response to a power outage, receive a third program operation command comprising the first data and a second address from the memory controller in a case that execution of the first program operation has been completed, wherein the second address corresponds to a second memory cell; generate level indicator data based on the first data; and perform a third program operation on the second memory cell of the memory to store the level indicator data.

In an example, the peripheral circuit is configured to: generate the level indicator data based on parity information of the first data.

In an example, the peripheral circuit is configured to: perform an XOR operation on the parity information of data of each page of the first data to generate the level indicator data. In an example, the peripheral circuit is configured to: perform a single level cell program operation on the second memory cell of the memory to store the level indicator data.

In an example, the peripheral circuit is configured to: receive a second program operation command comprising the first data and the first address from the memory controller; perform the second program operation on the first memory cell to store the first data; in response to the power outage, receive a fourth program operation command comprising the first data and a third address from the memory controller in a case that execution of the second program operation has not been completed, wherein the third address corresponds to a third memory cell; and perform a single level cell program operation on the third memory cell of the memory to store data of each page corresponding to the first data.

In an example, the peripheral circuit is configured to: in response to the power outage, receive, from the memory controller, a set feature command comprising a first parameter indicating to enable a coarse data backup function of the memory; and enable the coarse data backup function of the memory.

In an example, the first memory cell comprises a triple-level cell (TLC) or a quad-level cell (QLC).

In an example, the peripheral circuit is configured to: when power on, receive, from the memory controller, a set feature command comprising a second parameter indicating to enable a coarse data recovery function of the memory; receive a first read operation command comprising the first address from the memory controller; perform a third read operation on the first memory cell based on a first level read voltage to obtain third data and perform a fourth read operation on the first memory cell based on a second level read voltage to obtain fourth data; receive a second read operation command comprising the second address from the memory controller; and perform a second read operation on the second memory cell to obtain the level indicator data, to obtain the first data based on the level indicator data, the third data, and the fourth data.

In an example, the peripheral circuit is configured to: receive a fifth program operation command comprising the first data and the first address from the memory controller; and perform the second program operation on the first memory cell to store the first data.

In an example, the peripheral circuit is configured to: receive a sixth program operation command from the memory controller, wherein the sixth program operation command comprises the first data and a fourth address corresponding to a fourth memory cell; and perform a program operation on the fourth memory cell to store the first data.

In an example, the first level read voltage is a read voltage determined according to a voltage distribution in an odd state; and the second level read voltage is a read voltage determined according to a voltage distribution in an even state.

In an example, the obtaining the first data based on the level indicator data, the third data, and the fourth data comprises: using the third data as the first data when the level indicator data indicates an odd state; and using the fourth data as the first data when the level indicator data indicates an even state.

In an example, the peripheral circuit is configured to: after performing the first program operation, receive a read status command from the memory controller, such that the memory controller obtains an execution status of the first program operation; and determine whether execution of the first program operation has been completed based on the execution status of the first program operation.

According to yet another aspect of the present disclosure, there is provided a method of operating a memory, comprising: receiving a first program operation command comprising first data and a first address from a memory controller, wherein the first data is data to be stored to the memory based on a first program operation and a second program operation, and the first address corresponds to a first memory cell; performing the first program operation on the first memory cell to store the first data; in response to a power outage, receiving a third program operation command comprising the first data and a second address from the memory controller in a case that execution of the first program operation has been completed, wherein the second address corresponds to a second memory cell; generating level indicator data based on the first data; and performing a third program operation on the second memory cell of the memory to store the level indicator data.

In an example, the generating the level indicator data based on the first data comprises: generating the level indicator data based on parity information of the first data.

In an example, the generating the level indicator data based on the parity information of the first data comprises: performing an XOR operation on the parity information of data of each page of the first data to generate the level indicator data.

In an example, the performing the third program operation on the second memory cell of the memory to store the level indicator data comprises: performing a single level cell program operation on the second memory cell of the memory to store the level indicator data.

In an example, the method further comprises: receiving a second program operation command comprising the first data and the first address from the memory controller; performing the second program operation on the first memory cell to store the first data; in response to the power outage, receiving a fourth program operation command comprising the first data and a third address from the memory controller in a case that execution of the second program operation has not been completed, wherein the third address corresponds to a third memory cell; and performing a single level cell program operation on the third memory cell of the memory to store data of each page corresponding to the first data.

In an example, the method further comprises: in response to the power outage, receiving, from the memory controller, a set feature command comprising a first parameter indicating to enable a coarse data backup function of the memory; and enabling the coarse data backup function of the memory.

In an example, the first memory cell comprises a triple-level cell (TLC) or a quad-level cell (QLC).

In an example, the method further comprises: when power on, receiving, from the memory controller, a set feature command comprising a second parameter indicating to enable a coarse data recovery function of the memory; receiving a first read operation command comprising the first address from the memory controller; performing a third read operation on the first memory cell based on a first level read voltage to obtain third data and performing a fourth read operation on the first memory cell based on a second level read voltage to obtain fourth data; receiving a second read operation command comprising the second address from the memory controller; and performing a second read operation on the second memory cell to obtain the level indicator data, to obtain the first data based on the level indicator data, the third data, and the fourth data.

In an example, the method further comprises: receiving a fifth program operation command comprising the first data and the first address from the memory controller; and performing the second program operation on the first memory cell to store the first data.

In an example, the method further comprises: receiving a sixth program operation command from the memory controller, wherein the sixth program operation command comprises the first data and a fourth address corresponding to a fourth memory cell; and performing a program operation on the fourth memory cell to store the first data.

In an example, the first level read voltage is a read voltage determined according to a voltage distribution in an odd state; and the second level read voltage is a read voltage determined according to a voltage distribution in an even state.

In an example, the obtaining the first data based on the level indicator data, the third data, and the fourth data comprises: using the third data as the first data when the level indicator data indicates an odd state; and using the fourth data as the first data when the level indicator data indicates an even state.

In an example, the method further comprises: after performing the first program operation, receiving a read status command from the memory controller, such that the memory controller obtains an execution status of the first program operation; and determining whether execution of the first program operation has been completed based on the execution status of the first program operation.

According to yet still another aspect of the present disclosure, a computer readable storage medium is provided, wherein a control instruction in the computer readable storage medium, when executed by a controller processor, causes the controller processor to perform the operating method described above.

According to yet still another aspect of the present disclosure, a computer program product comprising a computer program/instruction is provided, wherein the computer program/instruction, when executed by a processor, implements the operating method described above.

According to the technical scheme of the present disclosure, in the process of performing multi-pass programming operation on the first data, if a power outage occurs, for the memory cell on which the first program operation has been performed, the second program operation would not be performed but the level indicator information of the first data is obtained, and the level indicator information of the first data is stored in the second memory cell through the third program operation. In this way, faster data storage can be realized, resources consumed by storage operation are saved, storage time is shortened, and data backup during power outage is better realized.

It should be understood that, the above general description and the following detailed description are merely examples and explanatory, and cannot limit the present disclosure.

The above descriptions are merely example implementations of the present disclosure, and the protection scope of the present disclosure is not limited thereto. Any variations or replacements readily conceivable by a person familiar with the existing technology within the technical scope disclosed by the present disclosure shall fall within the protection scope of the present disclosure. Therefore, the protection scope of the present disclosure shall be defined by the protection scope of the claims.

What is claimed is:

1. A memory system, comprising:

a memory device comprising a memory cell array and a peripheral circuit coupled to the memory cell array; and a memory controller coupled to the memory device, wherein the memory controller is configured to:

send a first program operation command to the memory device, wherein the first program operation command comprises first data and a first address, the first data is data to be stored to the memory device based on a first program operation and a second program operation, and the first address corresponds to a first memory cell; and in response to a power outage, send a third program operation command to the memory device in a case that execution of the first program operation has been completed, wherein the third program operation command comprises the first data and a second address, and the second address corresponds to a second memory cell; and the peripheral circuit is configured to:

receive the first program operation command from the memory controller to perform the first program operation on the first memory cell of the memory device to store the first data;

receive the third program operation command from the memory controller to generate a level indicator data based on the first data; and perform a third program operation on the second memory cell of the memory device to store the level indicator data.

2. The memory system of claim 1, wherein the peripheral circuit is configured to:

generate the level indicator data based on parity information of the first data.

3. The memory system of claim 2, wherein the peripheral circuit is configured to:

perform an XOR operation on the parity information of data of each page of the first data to generate the level indicator data.

4. The memory system of claim 1, wherein the peripheral circuit is configured to:

perform a single level cell program operation on the second memory cell of the memory device to store the level indicator data.

5. The memory system of claim 1, wherein the memory controller is further configured to:

send a second program operation command comprising the first data and the first address to the memory device;

in response to the power outage, send a fourth program operation command to the memory device in a case that execution of the second program operation command has not been completed, wherein the fourth program operation command comprises the first data and a third address, and the third address corresponds to a third memory cell; and the peripheral circuit is configured to:

receive the second program operation command from the memory controller to perform the second program operation command on the first memory cell of the memory device to store the first data; and receive the fourth program operation command from the memory controller to perform a single level cell program operation on the third memory cell of the memory device to store data of each page corresponding to the first data.

6. The memory system of claim 1, wherein the memory controller is configured to:

in response to the power outage, send, to the memory device, a set feature command comprising a first parameter indicating to enable a coarse data backup function of the memory device; and the peripheral circuit is configured to:

receive the set feature command from the memory controller to enable the coarse data backup function of the memory device.

7. The memory system of claim 1, wherein the first memory cell comprises a triple-level cell or a quad-level cell.

8. The memory system of claim 1, wherein the memory controller is configured to:

when power on, send, to the memory device, a set feature command comprising a second parameter indicating to enable a coarse data recovery function of the memory device;

send a first read operation command comprising the first address to the memory device to obtain third data and fourth data;

send a second read operation command comprising the second address to the memory device to obtain the level indicator data; and obtain the first data based on the level indicator data, the third data, and the fourth data; and the peripheral circuit is configured to:

receive the first read operation command from the memory controller, to perform a third read operation on the first memory cell based on a first level read voltage to obtain the third data, and to perform a fourth read operation on the first memory cell based on a second level read voltage to obtain the fourth data; and receive the second read operation command from the memory controller to perform a second read operation on the second memory cell to obtain the level indicator data.

9. The memory system of claim 8, wherein the memory controller is configured to:

send a fifth program operation command comprising the first data and the first address to the memory device; and the peripheral circuit is configured to:

receive the fifth program operation command from the memory controller to perform the second program operation on the first memory cell to store the first data.

10. The memory system of claim 8, wherein the memory controller is configured to:

send a sixth program operation command comprising the first data and a fourth address to the memory device, wherein the fourth address corresponds to a fourth memory cell; and the peripheral circuit is configured to:

receive the sixth program operation command from the memory controller to perform a program operation on the fourth memory cell to store the first data.

11. The memory system of claim 8, wherein the first level read voltage is a read voltage determined according to a voltage distribution in an odd state; and the second level read voltage is a read voltage determined according to a voltage distribution in an even state.

12. The memory system of claim 11, wherein the memory controller is configured to:

use the third data as the first data when the level indicator data indicates an odd state; and use the fourth data as the first data when the level indicator data indicates an even state.

13. The memory system of claim 1, wherein the memory controller is configured to:

after sending the first program operation command to the memory device, send a read status command to the memory device to obtain an execution result of the first program operation; and determine whether execution of the first program operation has been completed based on the execution result of the first program operation.

14. The memory system of claim 1, further comprising a backup power supply for providing power to the memory system when a power outage occurs.

15. The memory system of claim 14, wherein the backup power supply comprises a capacitor.

16. A memory controller, comprising:

a controller memory device configured to store control instructions; and a controller processor coupled to the controller memory device and configured to execute the control instructions to perform processing comprising:

sending a first program operation command comprising first data and a first address to a memory device, wherein the first data is data to be stored to the memory device based on a first program operation and a second program operation, and the first address corresponds to a first memory cell; and in response to a power outage, sending a third program operation command comprising the first data and a second address to the memory device in a case that execution of the first program operation has been completed, wherein the second address corresponds to a second memory cell, such that the memory device generates level indicator data based on the first data, and performs a third program operation on the second memory cell to store the level indicator data.

17. The memory controller of claim 16, wherein the processing comprises:

generating the level indicator data based on parity information of the first data.

18. The memory controller of claim 16, wherein the third program operation comprises a single level cell program operation.

19. The memory controller of claim 16, wherein the processing comprises:

sending a second program operation command comprising the first data and the first address to the memory device; and in response to the power outage, sending a fourth program operation command comprising the first data and a third address to the memory device in a case that execution of the second program operation has not been completed, wherein the third address corresponds to a third memory cell, such that the memory device performs a single level cell program operation on the third memory cell to store data of each page corresponding to the first data.

20. A memory device, comprising:

a memory cell array; and a peripheral circuit coupled to the memory cell array and configured to:

receive a first program operation command comprising first data and a first address from a memory controller, wherein the first data is data to be stored to the memory device based on a first program operation and a second program operation, and the first address corresponds to a first memory cell;

perform the first program operation on the first memory cell to store the first data;

in response to a power outage, receive a third program operation command comprising the first data and a second address from the memory controller in a case that execution of the first program operation has been completed, wherein the second address corresponds to a second memory cell;

generate level indicator data based on the first data; and perform a third program operation on the second memory cell of the memory device to store the level indicator data.

* * * * *